United States Patent
McGowan et al.

(10) Patent No.: US 10,532,662 B2
(45) Date of Patent: Jan. 14, 2020

(54) EDDY CURRENT BRAKING DEVICE FOR ROTARY SYSTEMS

(71) Applicants: John Lewis McGowan, Boulder, CO (US); Steven K. Holmes, Golden, CO (US)

(72) Inventors: John Lewis McGowan, Boulder, CO (US); Steven K. Holmes, Golden, CO (US)

(73) Assignee: TRUBLUE LLC, Boulder, CO (US)

(*) Notice: Subject to any disclaimer, the term of this patent is extended or adjusted under 35 U.S.C. 154(b) by 0 days.

(21) Appl. No.: 14/831,358

(22) Filed: Aug. 20, 2015

(65) Prior Publication Data

US 2016/0052401 A1   Feb. 25, 2016

Related U.S. Application Data

(60) Provisional application No. 62/039,731, filed on Aug. 20, 2014.

(51) Int. Cl.
*A62B 1/08* (2006.01)
*B60L 7/28* (2006.01)
(Continued)

(52) U.S. Cl.
CPC ............... *B60L 7/28* (2013.01); *B60T 7/128* (2013.01); *B60T 13/748* (2013.01); *B61B 3/00* (2013.01);
(Continued)

(58) Field of Classification Search
CPC ........ A62B 1/08; H02K 59/04; H02K 59/046; H02K 2213/09; H02K 49/043;
(Continued)

(56) References Cited

U.S. PATENT DOCUMENTS 2,058,024 A   10/1936   Logan, Jr.
2,112,312 A   6/1938   Cassion et al.
(Continued)

FOREIGN PATENT DOCUMENTS

AU   2010221817   10/2011
CA   2789535   9/2010
(Continued)

OTHER PUBLICATIONS

PCT International Search Report and Written Opinion in International Application PCT/US2015/046172, dated Dec. 9, 2015, 15 pgs.
(Continued)

*Primary Examiner* — Robert A. Siconolfi
*Assistant Examiner* — San M Aung

(57) ABSTRACT

An apparatus has a first portion of a magnetic braking system with a first element disposed thereon. The first portion rotates about an axis. The position of the first element is a fixed distance from the axis. A second portion of the magnetic braking system has a second element disposed thereon. A spring biases the rotatable first portion a first distance from the second portion. Upon application of a force to one of the portions, the relative position of the rotatable first portion to the second portion is reduced to a second distance less than the first distance.

21 Claims, 24 Drawing Sheets

(51) Int. Cl.
*B60T 7/12* (2006.01)
*B61B 3/00* (2006.01)
*B61H 7/08* (2006.01)
*B60T 13/74* (2006.01)
*F16D 63/00* (2006.01)
*H02K 49/04* (2006.01)

(52) U.S. Cl.
CPC ............ *B61H 7/083* (2013.01); *F16D 63/002* (2013.01); *F16D 63/008* (2013.01); *H02K 49/046* (2013.01); *A62B 1/08* (2013.01); *H02K 2213/09* (2013.01); *Y02T 10/641* (2013.01)

(58) Field of Classification Search
CPC ........ H02K 7/1025; B61H 7/083; B61B 3/00; B60L 7/28; B60L 2200/26; B60T 1/14; B60T 7/128; B60T 13/748; B66B 5/16; F01D 5/10; F01D 25/04; F01D 25/06; F16C 32/0425; F16C 32/0438; F16C 39/066; F16D 63/002; F16D 63/008; F16D 2121/14; F16D 2121/16; F16D 2121/20; F16D 2121/22; F16D 55/00; F16D 51/00; F16D 59/02; F16F 15/035; B62L 3/00; B62L 3/02; B62T 11/04; B62T 11/046
USPC ............................ 188/164, 160, 162, 180, 67
See application file for complete search history.

(56) References Cited

U.S. PATENT DOCUMENTS

| | | | |
|---|---|---|---|
| 2,122,315 A | 6/1938 | Fosty et al. | |
| 2,409,009 A | 10/1946 | Bakke | |
| 2,428,104 A | 9/1947 | Winther | |
| 2,492,776 A | 12/1949 | Winther | |
| 2,771,171 A | 11/1956 | Schultz | |
| 3,364,795 A | 1/1968 | Coye De Casetlet | |
| 3,447,006 A | 5/1969 | Bair | |
| 3,721,394 A | 3/1973 | Reiser | |
| 3,723,795 A * | 3/1973 | Baermann | B61H 7/083 310/93 |
| 3,759,190 A | 9/1973 | Harvey | |
| 3,962,595 A | 6/1976 | Eddens | |
| 3,967,794 A | 7/1976 | Fohl | |
| 4,078,719 A | 3/1978 | Durland et al. | |
| 4,224,545 A | 9/1980 | Powell | |
| 4,271,944 A | 6/1981 | Hanson | |
| 4,416,430 A | 11/1983 | Totten | |
| 4,434,971 A | 3/1984 | Cordrey | |
| 4,544,111 A | 10/1985 | Nakajima | |
| 4,545,575 A | 10/1985 | Forjot | |
| 4,561,605 A | 12/1985 | Nakajima | |
| 4,567,963 A | 2/1986 | Sugimoto | |
| 4,612,469 A | 9/1986 | Muramatsu | |
| 4,690,066 A | 9/1987 | Morishita et al. | |
| 4,938,435 A | 7/1990 | Varner et al. | |
| 4,957,644 A | 9/1990 | Price et al. | |
| 5,054,587 A | 10/1991 | Matsui et al. | |
| 5,064,029 A | 11/1991 | Araki et al. | |
| 5,205,386 A | 4/1993 | Goodman et al. | |
| 5,254,061 A * | 10/1993 | Leask | A63B 21/0052 482/5 |
| 5,342,000 A * | 8/1994 | Berges | B65H 59/00 242/155 M |
| 5,429,319 A * | 7/1995 | Bogucki-Land | B65H 59/16 188/296 |
| 5,441,137 A | 8/1995 | Organek et al. | |
| 5,465,815 A | 11/1995 | Ikegami | |
| 5,636,804 A | 6/1997 | Jeung | |
| 5,692,693 A | 12/1997 | Yamaguchi | |
| 5,711,404 A | 1/1998 | Lee | |
| 5,712,520 A | 1/1998 | Lamb | |
| 5,722,612 A | 3/1998 | Feathers | |
| 5,742,986 A | 4/1998 | Corrion et al. | |
| 5,779,178 A | 7/1998 | McCarty | |
| 5,791,584 A | 8/1998 | Kuroiwa | |
| 5,822,874 A | 10/1998 | Nemes | |
| 5,862,891 A | 1/1999 | Kroger et al. | |
| 5,928,300 A | 7/1999 | Rogers et al. | |
| 6,041,897 A | 3/2000 | Saumweber et al. | |
| 6,042,517 A | 3/2000 | Gunther et al. | |
| 6,051,897 A | 4/2000 | Wissler et al. | |
| 6,062,350 A | 5/2000 | Spieldiener et al. | |
| 6,086,005 A | 7/2000 | Kobayashi et al. | |
| 6,279,682 B1 | 8/2001 | Feathers | |
| 6,286,637 B1 * | 9/2001 | Park | B60L 7/28 188/158 |
| 6,293,376 B1 | 9/2001 | Pribonic | |
| 6,360,669 B1 | 3/2002 | Albrich | |
| 6,412,611 B1 | 7/2002 | Pribonic | |
| 6,460,828 B1 * | 10/2002 | Gersemsky | A61G 7/1042 254/267 |
| 6,533,083 B1 | 3/2003 | Pribonic | |
| 6,523,650 B1 | 5/2003 | Pribonic | |
| 6,557,673 B1 | 5/2003 | Desta et al. | |
| 6,561,451 B1 | 5/2003 | Steinich | |
| 6,640,727 B2 | 11/2003 | Ostrobrod | |
| 6,659,237 B1 | 12/2003 | Pribonic | |
| 6,756,870 B2 | 6/2004 | Kuwahara | |
| 6,793,203 B2 | 9/2004 | Heinrichs et al. | |
| 6,810,818 B2 | 11/2004 | Petzl et al. | |
| 6,810,997 B2 | 11/2004 | Scheiber et al. | |
| 6,918,469 B1 | 7/2005 | Pribonic | |
| 6,962,235 B2 | 11/2005 | Leon | |
| 6,973,999 B2 | 12/2005 | Ikuta et al. | |
| 7,011,607 B2 | 3/2006 | Kolda et al. | |
| 7,014,026 B2 | 3/2006 | Drussel et al. | |
| 7,018,324 B1 | 3/2006 | Lin | |
| 7,279,055 B2 | 10/2007 | Schuler | |
| 7,281,612 B2 | 10/2007 | Hsieh | |
| 7,281,620 B2 | 10/2007 | Wolner | |
| 7,513,334 B2 | 4/2009 | Calver | |
| 7,528,514 B2 | 5/2009 | Cruz et al. | |
| 7,966,941 B1 | 6/2011 | Brannan | |
| 7,894,796 B2 | 7/2011 | Pribonic | |
| 8,272,476 B2 | 9/2012 | Hartman et al. | |
| 8,424,460 B2 | 4/2013 | Lerner et al. | |
| 8,490,751 B2 | 7/2013 | Allington et al. | |
| 8,511,434 B2 | 8/2013 | Blomberg | |
| 8,556,234 B2 | 10/2013 | Hartman et al. | |
| 8,567,561 B2 | 10/2013 | Strasser et al. | |
| 8,601,951 B2 | 12/2013 | Lerner | |
| 8,851,235 B2 | 10/2014 | Allington et al. | |
| 9,016,435 B2 | 4/2015 | Allington et al. | |
| 9,033,115 B2 | 5/2015 | Lerner | |
| 9,962,588 B2 | 5/2018 | Allington et al. | |
| 10,020,720 B2 | 7/2018 | Diehl et al. | |
| 2002/0162477 A1 | 11/2002 | Palumbo | |
| 2002/0179372 A1 | 12/2002 | Schreiber et al. | |
| 2003/0116391 A1 | 6/2003 | Desta et al. | |
| 2003/0189380 A1 * | 10/2003 | Ishikawa | B60L 7/10 310/77 |
| 2003/0211914 A1 | 11/2003 | Perkins et al. | |
| 2004/0055836 A1 | 3/2004 | Pribonic | |
| 2004/0073346 A1 | 4/2004 | Roelleke | |
| 2004/0074715 A1 * | 4/2004 | Johansson | B60T 1/14 188/161 |
| 2004/0168855 A1 | 9/2004 | Leon | |
| 2004/0194101 A1 | 9/2004 | Bytnar et al. | |
| 2005/0117258 A1 | 6/2005 | Ohta et al. | |
| 2005/0189830 A1 | 9/2005 | Corbin et al. | |
| 2005/0263356 A1 | 12/2005 | Marzano et al. | |
| 2006/0243545 A1 * | 11/2006 | Chen | B60T 1/10 188/164 |
| 2006/0278478 A1 | 12/2006 | Pribonic et al. | |
| 2007/0000741 A1 | 1/2007 | Pribonic | |
| 2007/0135561 A1 | 6/2007 | Rath et al. | |
| 2007/0228202 A1 | 10/2007 | Scharf et al. | |
| 2007/0228713 A1 | 10/2007 | Takemura | |
| 2007/0256906 A1 | 11/2007 | Jin et al. | |
| 2007/0298935 A1 * | 12/2007 | Badarneh | A63B 22/001 482/52 |

(56) References Cited

U.S. PATENT DOCUMENTS

| | | |
|---|---|---|
| 2008/0059028 A1 | 3/2008 | Willerton |
| 2008/0074223 A1 | 3/2008 | Pribonic |
| 2008/0087510 A1 | 4/2008 | Pribonic |
| 2008/0105503 A1 | 5/2008 | Pribonic |
| 2008/0135579 A1 | 6/2008 | Bertram et al. |
| 2009/0026303 A1 | 1/2009 | Schmitz et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2010/0032255 A1 | 2/2010 | Conti et al. |
| 2010/0065373 A1 | 3/2010 | Stone et al. |
| 2010/0112224 A1 | 5/2010 | Lott |
| 2010/0211239 A1 | 8/2010 | Christensen et al. |
| 2011/0114907 A1 | 5/2011 | Hartman et al. |
| 2011/0147125 A1 | 6/2011 | Blomberg |
| 2011/0175473 A1 | 7/2011 | Kitabatake et al. |
| 2011/0313607 A1* | 12/2011 | Checketts ............... B60T 7/12 701/22 |
| 2012/0055740 A1 | 3/2012 | Allington et al. |
| 2012/0312540 A1 | 12/2012 | Lefebvre |
| 2013/0048422 A1 | 2/2013 | Hartman et al. |
| 2013/0087433 A1 | 4/2013 | Sejourne |
| 2013/0118842 A1 | 5/2013 | Lerner et al. |
| 2013/0186721 A1 | 7/2013 | Bogdanowicz et al. |
| 2013/0216351 A1* | 8/2013 | Griffin ................... F01D 25/06 415/1 |
| 2014/0110947 A1 | 4/2014 | Mongeau |
| 2014/0224597 A1 | 8/2014 | Takezawa et al. |
| 2014/0346909 A1 | 11/2014 | Vogler et al. |
| 2014/0375158 A1 | 12/2014 | Allington et al. |
| 2015/0196820 A1 | 7/2015 | Allington et al. |
| 2015/0266454 A1 | 9/2015 | McGowan |
| 2016/0052400 A1 | 2/2016 | McGowan et al. |
| 2016/0317936 A1 | 11/2016 | Diehl et al. |
| 2016/0360738 A1 | 12/2016 | Richardson |
| 2017/0237313 A1 | 8/2017 | Diehl et al. |
| 2017/0274261 A1 | 9/2017 | Allington et al. |
| 2017/0328424 A1 | 11/2017 | Allington et al. |
| 2017/0338728 A1 | 11/2017 | Diehl et al. |

FOREIGN PATENT DOCUMENTS

| | | |
|---|---|---|
| CN | 1262196 A | 8/2000 |
| CN | 1325362 A | 12/2001 |
| CN | 1370702 A | 9/2002 |
| CN | 1783674 | 6/2006 |
| CN | 202203305 | 8/2011 |
| CN | 102428633 | 4/2012 |
| CN | 102497085 | 6/2012 |
| CN | 102627063 | 8/2012 |
| CN | 102652029 A | 8/2012 |
| CN | 103244577 | 4/2013 |
| CN | 103326538 | 9/2013 |
| CN | 106100285 | 11/2016 |
| DE | 674761 C | 4/1939 |
| DE | 9300966 | 3/1993 |
| DE | 102005032694 | 1/2007 |
| DE | 102007022883 | 12/2008 |
| EP | 84140 A1 * | 7/1983 |
| EP | 84140 A1 * | 7/1983 |
| EP | 460494 | 12/1991 |
| EP | 1043265 A2 | 10/2000 |
| EP | 1244565 | 10/2002 |
| EP | 1401087 | 3/2004 |
| EP | 1432101 | 6/2004 |
| EP | 1480320 | 11/2004 |
| EP | 1564868 | 8/2005 |
| EP | 2406872 | 1/2012 |
| GB | 721748 | 1/1955 |
| GB | 908128 | 10/1962 |
| GB | 1593348 | 7/1981 |
| GB | 2352644 | 2/2001 |
| GB | 2352645 | 2/2001 |
| GB | 2352784 | 2/2001 |
| GB | 2357563 | 6/2001 |
| JP | S 60259278 A | 12/1985 |
| JP | S62247753 | 10/1987 |
| JP | 5296287 | 11/1993 |
| JP | H05296287 | 11/1993 |
| JP | 8252025 | 10/1996 |
| JP | 10098868 | 4/1998 |
| JP | 10140536 | 5/1998 |
| JP | 10252025 | 9/1998 |
| JP | 11119680 | 4/1999 |
| JP | 11189701 | 7/1999 |
| JP | 11315662 | 11/1999 |
| JP | 2000-316272 | 11/2000 |
| JP | 2001-17041 | 1/2001 |
| JP | 2011200002 A | 10/2011 |
| JP | 2012520655 | 9/2012 |
| JP | 2015122952 | 7/2015 |
| NZ | 575464 | 7/2010 |
| WO | WO 95/16496 | 6/1995 |
| WO | 199617149 | 6/1996 |
| WO | 199847215 | 10/1998 |
| WO | 200138123 | 5/2001 |
| WO | 2003055560 | 7/2003 |
| WO | 2008139127 | 11/2008 |
| WO | 2009047469 | 4/2009 |
| WO | 2009108040 | 9/2009 |
| WO | 2009127142 | 10/2009 |
| WO | 20100108484 A1 | 9/2010 |
| WO | WO 2010104405 | 9/2010 |
| WO | 2011079266 | 6/2011 |

OTHER PUBLICATIONS

PCT International Search Report and Written Opinion in International Application PCT/US2015/046171, dated Feb. 26, 2016, 21 pgs.

PCT Partial Search Report in International Application PCT/US2015/046171, dated Dec. 9, 2015, 8 pgs.

Climbing Wall Descent Controllers—Instruction Manual v3, Aug. 18, 2008, pp. 1-20.

TruBlue Auto Belay User Manual, Model TB150-12C, 27 pages.

PCT International Search Report and Written Opinion in Application PCT-NZ2010/00011, dated Feb. 23, 2011, 11 pages.

MSA, The Safety Company, Stop Use Notice for Redpoint and Auto-Belay Descenders, dated Oct. 14, 2009, 1 page.

European Office Action in Application 15759996.0, dated Nov. 21, 2018, 7 pages.

European Office Action in Application 15759997.8, dated Nov. 26, 2018, 9 pages.

Chinese Office Action in Application 201580056441.6, dated Dec. 27, 2018, 11 pages.

Chinese Office Action in Application 201580056996.0, dated Dec. 27, 2018, 20 pages.

* cited by examiner

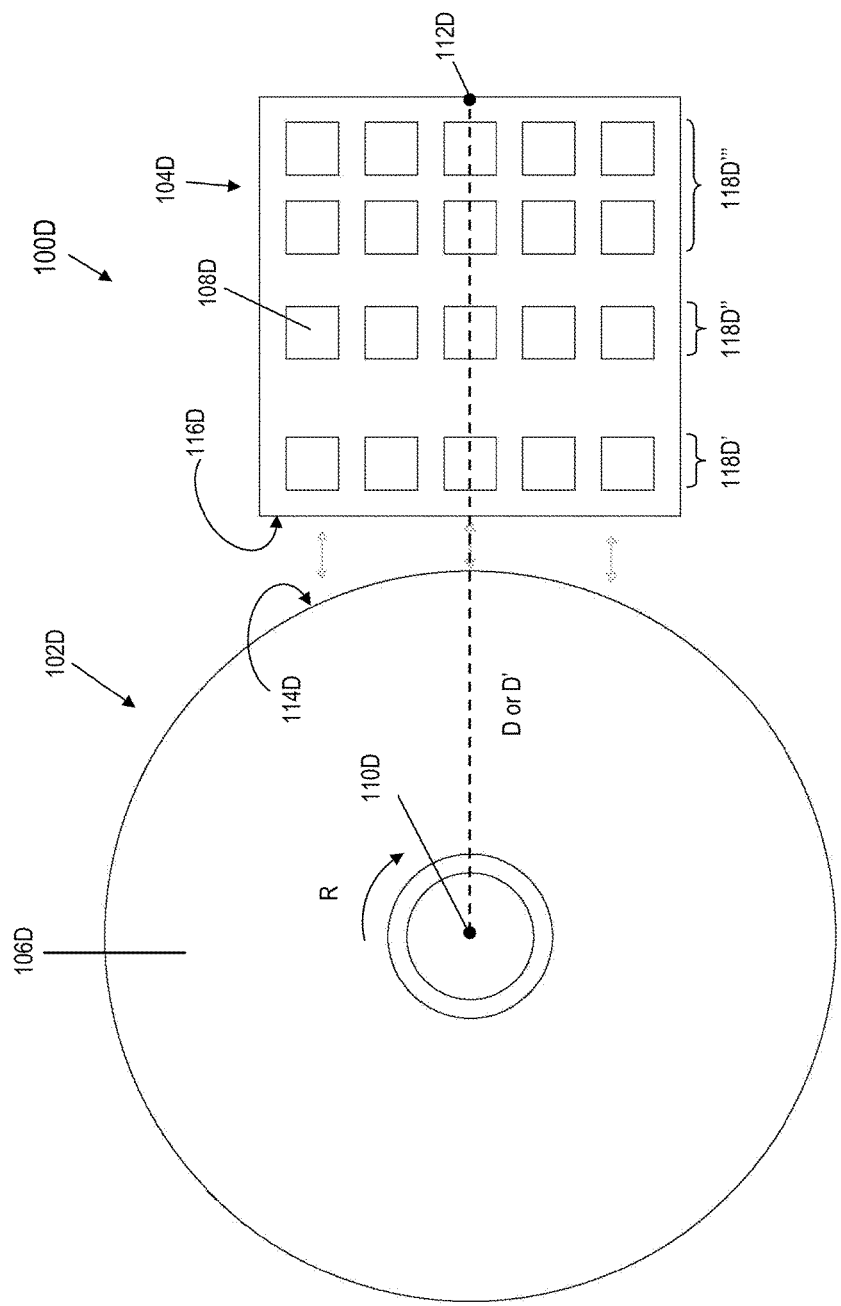

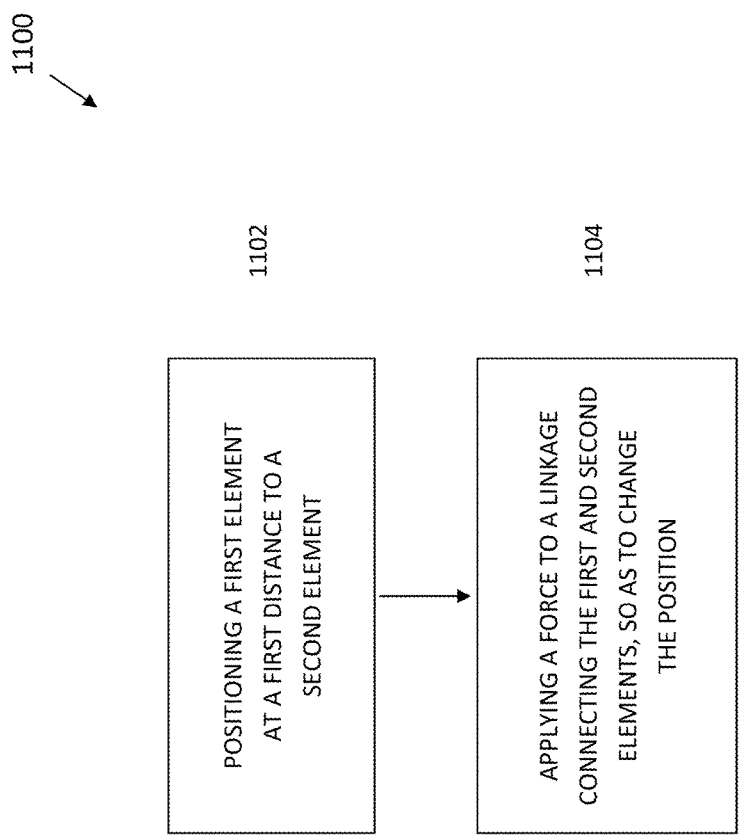

EDDY CURRENT BRAKING DEVICE FOR ROTARY SYSTEMS

CROSS-REFERENCE TO RELATED APPLICATIONS

This application claims priority to and the benefit of U.S. Provisional Patent Application No. 62/039,731, filed Aug. 20, 2014, the disclosure of which is hereby incorporated by reference herein in its entirety.

INTRODUCTION

Eddy current braking systems may use centrifugal force to cause rotors to expand into a magnetic field. Centrifugal eddy current devices require significant support structure in the rotating rotor assembly to support the centrifugally deploying electrically conductive members, and to ensure that they remain in plane during deployment so that they don't make contact with magnets. Because of the complexity, structure, part count, and mass of incorporating the biasing mechanism(s) into a rotating assembly in which the electrically conductive members deploy centrifugally, the systems contain a significant amount of rotational inertia. Because of this, the initiation of eddy-current braking can be delayed during deployment, and/or completion of braking can be delayed once the load motion has ceased. Furthermore, this delay is intrinsic to the design and cannot be controlled or adjusted without redesigning the unit.

Even with such extensive support structure, such devices still require very exacting tolerances to allow the peripherally mounted conductive members to reliably move on the same plane into the magnetic field. If a conductive member's pivot is out of tolerance even by very slight amounts (something that can occur due to material defect or if a device has been dropped or suffered an impact) the conductive member can make contact with a magnet during braking, thereby damaging the device and preventing correct rotor deployment.

Heat dissipation is also an issue. Because eddy current braking systems convert kinetic (e.g., rotational) energy into heat, effectively removing the heat before the various components of the braking system are damaged is a design criteria. Centrifugal devices rely on smooth sided, low-friction conductive members to centrifugally deploy into the magnetic field while sliding against a constraining structure. Because of this, conductive member heat dissipation (an important factor in eddy current braking) is extremely limited.

For eddy current braking systems that include a retraction spring, such as self-retracting lifelines, auto belay devices and recreational self-retracting descent devices, a device with a heavier rotor assembly retracts more slowly and requires a larger and more robust retraction spring to perform the same work. Because of the limitations of acceptable device size, a larger retraction spring may not be an option, resulting in a device that cannot handle high cyclic usage (e.g., the retraction spring fatigues and fails rapidly).

Centrifugal eddy current devices often include multiple biasing elements, one for each deploying rotor. This both increases the complexity of the device and makes bias adjustment more difficult. Indeed, most centrifugal systems are not provided with adjustable biasing which would allow a device to be used in different applications. Rather, centrifugal systems are provided with a manufacturer-selected fixed bias that is determined based on the average load conditions expected for the end-use of the device. In addition, the sheer complexity of the centrifugal design contributes to a high manufacturing cost and a high servicing cost.

SUMMARY

The eddy current braking systems described herein utilize a direct mechanical linkage activated by an applied load to move a conductor closer to a magnetic field generated by a magnet assembly (either by moving the conductor, moving the magnet assembly, or both). Through the mechanical linkage, the amount of load applied dictates the distance between the conductor and magnet assembly, thereby causing the braking force to vary with the applied load. The applied load causes a rotation of the device proximate a magnetic field to generate the braking force. Most of the examples described herein will be described in terms of a line dispensing device such as an autobelay or descending device in which the load is applied by the payload being lowered by the device. The reader, however, will understand that the load controlled braking devices described herein could be adapted to any number of devices and uses beyond those presented in the drawings.

In one aspect, the technology relates to: an apparatus having: a rotatable first portion of a magnetic braking system having a first element disposed thereon, wherein the first portion is rotatable about a rotatable first axis, and wherein a position of the first element is disposed a fixed distance from the rotatable first axis; a second portion of the magnetic braking system having a second element disposed thereon, wherein at least one of the first element and the second element generates a magnetic field; and a spring for biasing the rotatable first portion a first distance from the second portion, wherein upon application of a force to at least one of the rotatable first portion and the second portion, a relative position of the rotatable first portion to the second portion is reduced to a second distance less than the first distance. In an embodiment, the second portion is rotatable about a second axis. In another embodiment, a position of the second element is disposed a fixed distance from the second axis. In yet another embodiment, the first element includes a plurality of magnets and the second element includes a conductor. In still another embodiment, the first element has a conductor and the second element has a plurality of magnets.

In another embodiment of the above aspect, the apparatus further includes: a rotatable drum; a length of material wound about the drum; and wherein the force is applied to at least one of the rotatable first portion and the second portion by a weight applied to the length of material. In an embodiment, the length of material includes a length of at least one of a webbing, a cable, a rope, and a chain. In another embodiment, a rotation of the rotatable drum causes a corresponding rotation of the rotatable first portion. In yet another embodiment, the apparatus further includes a plurality of gears disposed between the rotatable drum and the rotatable first portion.

In another aspect, the technology relates to an apparatus having: a first portion of a magnetic braking system having a first element, wherein the first element is arranged in an array, wherein the first element is a first fixed distance from a first datum; a second portion of the magnetic braking system having a second element, wherein the second element is a second fixed distance from a second datum, wherein at least one of the first element and the second element generates a magnetic field; a linkage connecting the first portion and the second portion, wherein an application of a force to the linkage changes a position of the first datum relative to the second datum. In an embodiment, the first portion is rotatable about the first datum. In another embodiment, the second portion is rotatable about the second datum. In yet another embodiment, the linkage has a biasing element configured to bias the first datum a first distance away from the second datum, and wherein the application of the force moves the first datum relative to the second datum. In still another embodiment, the application of the force moves the first portion to a second distance relative to the second datum, wherein the second distance is less than the first distance.

In another embodiment of the above aspect, the apparatus further includes: a rotatable drum; a length of material wound about the drum; and wherein a rotation of the rotatable drum generates a corresponding rotation of at least one of the first portion and the second portion. In an embodiment, a weight applied to the length of material generates the force applied to the linkage. In another embodiment, the array includes a plurality of first elements. In yet another embodiment, the array defines: a first subset of first elements disposed a first subset distance from the first datum; and a second subset of first elements disposed a second subset distance from the first datum. In still another embodiment, the first subset includes a first number of first elements and wherein the second subset includes a second number of first elements, and wherein the second subset is different than the first subset.

In another embodiment of the above aspect, the first subset includes a first density per a fixed unit area of first elements and wherein the second subset includes a second density per the fixed unit area of first elements, and wherein the second subset is different than the first subset. In an embodiment, the first subset includes a first area of first elements and wherein the second subset includes a second area of first elements, and wherein the second subset is different than the first subset.

In another aspect, the technology relates to a method including: positioning a first portion at a first distance to a second portion, wherein: the first portion has a first element of a magnetic braking system, and wherein the first element is a first fixed distance from a first datum; and the second portion has a second element of the magnetic braking system, wherein the second element is a second fixed distance from a second datum, and wherein at least one of the first element and the second element generates a magnetic field; and applying a force to a linkage connecting the first portion and the second portion, wherein the application of the force to the linkage changes a position of the first datum relative to the second datum.

BRIEF DESCRIPTION OF THE DRAWINGS

There are shown in the drawings, examples which are presently preferred, it being understood, however, that the technology is not limited to the precise arrangements and instrumentalities shown.

FIGS. 1A-1H depict schematic views of first and second portions of eddy current braking systems in accordance with examples of the technology.

FIG. 11 depicts a method of operating an eddy current braking system in accordance with an example of the technology.

DETAILED DESCRIPTION

Figure 1A:
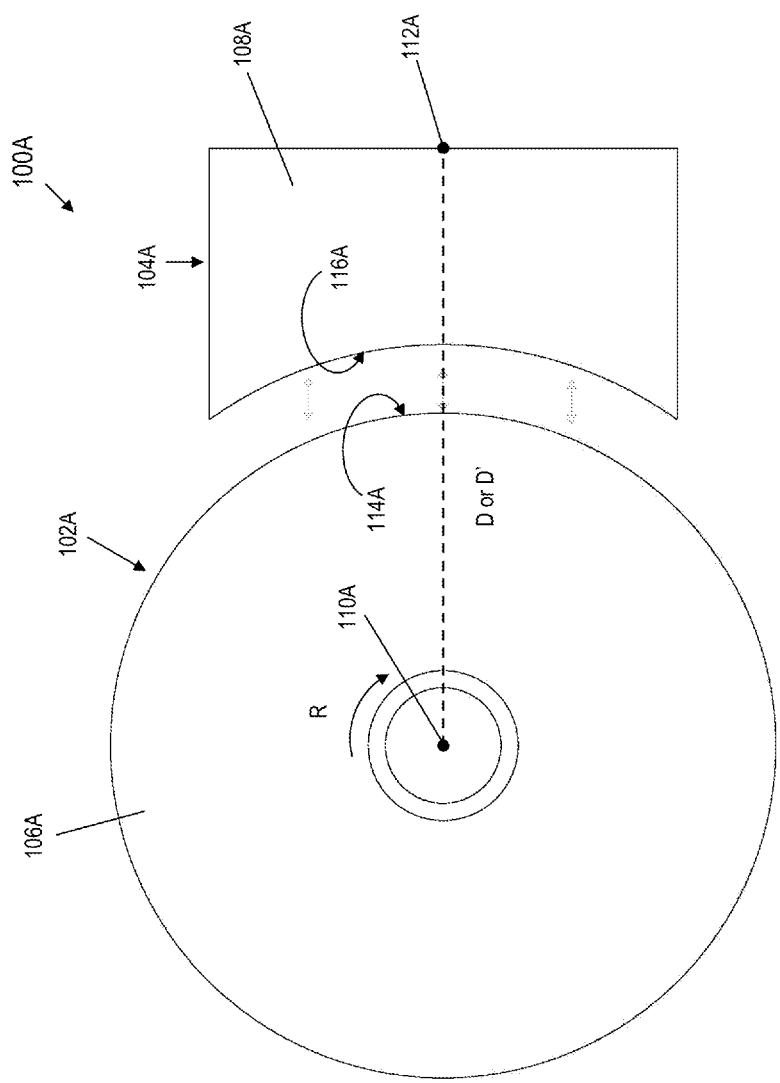

Several configurations of eddy braking systems are contemplated and depicted in the following figures. FIGS. 1A-1H depict schematic views of first and second portions of eddy current braking systems 100 in accordance with examples of the technology. The various examples are described generally below, with regard to shared aspects, structures, and functions. Components common to systems 100 described in FIGS. 1A-1H are identified only by root numbers (e.g., "first datum 100"), without regard to suffix (e.g., A-H). With regard to specific examples of the eddy current braking systems 100A-H of FIGS. 1A-1H, specifics of the various examples are described following in this general presentation. In general, each braking system 100 includes first portion 102 and a second portion 104. In various examples, each portion 102, 104 can include (or be manufactured from) one or more electrically conductive elements 106 and/or magnetic elements 108. The electrically conductive element is also referred to herein as a conductor, conductor element, or conductive element. The magnetic element is also referred to herein as a magnet. The first portion 102 includes a datum 110, and the second portion 104 includes a datum 112. The location of the datums 110, 112 on their respective first and second portions 102, 104 may be defined as required or desired for a particular application. For example, datums for rotating elements may be defined as an axis A about which that element rotates. Datums for non-rotational elements may be defined as a fixed point P on that element.

The datums 110, 112 define points by which to measure the spacing between the first portion 102 and the second portion 104. For example, in one condition of the braking system 100, the datums 110, 112 are separated by a first distance D. In a second condition, the datums 110, 112 are separated by a second distance D' that is less than the first distance D. As the distance D between the datums 110, 112 is reduced, the conductor elements 106 and magnetic elements 108 overlap, thereby causing the braking force to vary with an applied load force F. Additionally or alternatively, the second condition can contemplate a closer proximity or shorter distance between the conductor elements 106 and magnetic elements can also generate a higher braking force. In general, the farther the conductor 106 penetrates the magnetic field generated by the magnets 108, the greater the braking force applied. Each of the datums 110, 112 serve as reference points for the conductor elements 106 and/or magnetic elements 108. For example, in the example depicted in FIG. 1A, the conductor element 106A is a fixed, constant distance from the datum 110A, in that the entire first portion 102A is made from the conductor element 106A. In other words, the conductor element 106A does not move relevant to its datum. Similarly, the magnetic element 108A is a fixed, constant distance from the datum 112A, in that the entire second portion 104A is made from the magnetic element 108A. Again, the magnetic element 108A does not move relative to its datum 112A.

As the distance D between datums 110, 112 is reduced to the shorter distance D', the conductor element 106A moves into a magnetic field generated by the magnetic element 108A. Movement of the datums 110, 112 can be caused by the application of a force, as described in various examples below. If one of the portions 102, 104 is rotating R, a magnetic force generated on the conductor element 106 by the magnetic element 108 begins to slow rotation R of that portion 102, 104. As the datums 110, 102 move closer together, the conductor element 106 further overlaps the magnetic element, such that a greater magnetic force is applied, further slowing the rotation R. This helps apply a braking force that is directly related to, e.g., a weight force acting upon the system 100, as described below. It is desirable that the portions 102, 104 do not contact each other, as this may cause damage and failure of the system 100. As such, the portions 102, 104 may be disposed in different planes such that facing edges 114, 116 may overlap as the datums 110, 112 move closer together.

Figure 1B:
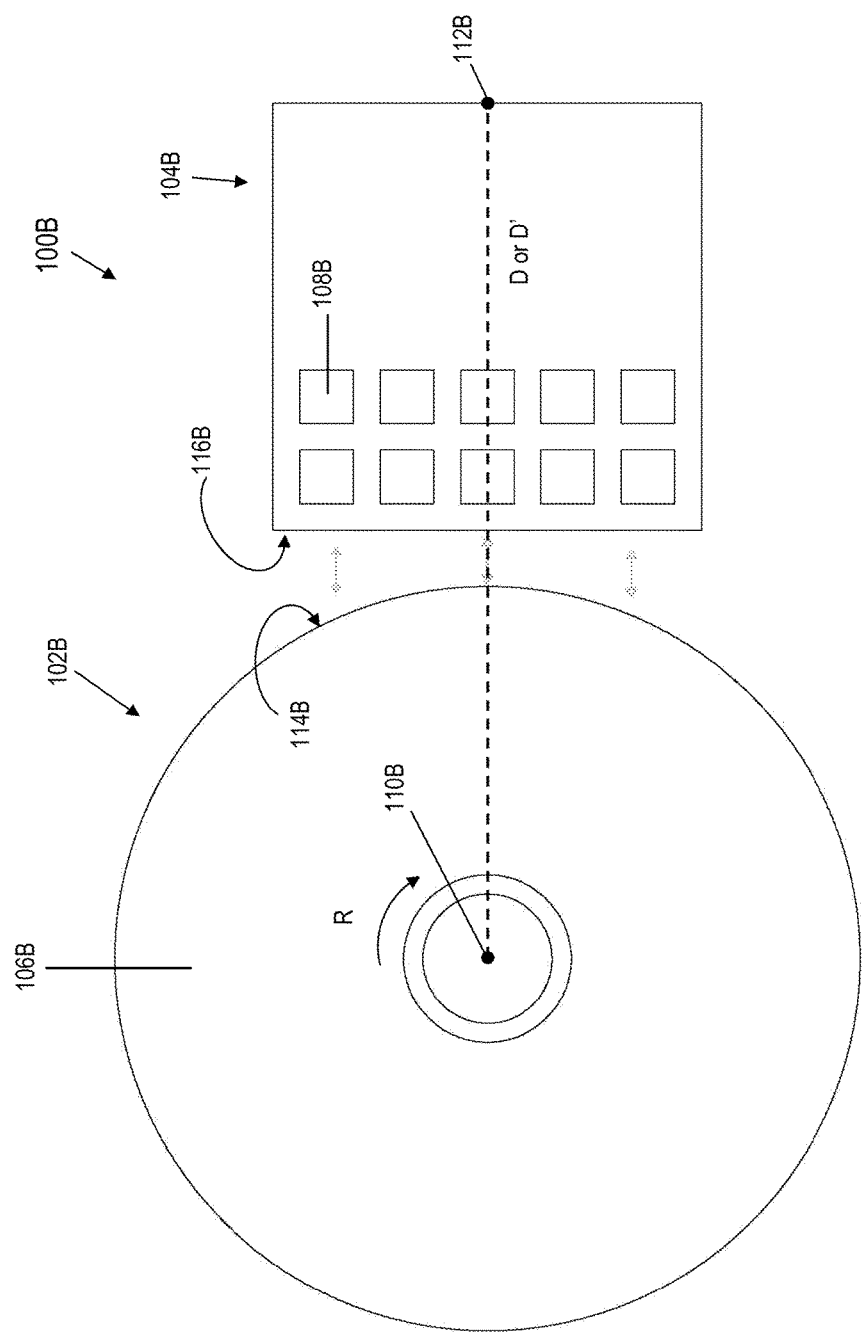

With regard to specific examples depicted in the figures, FIG. 1A depicts a braking system 100A including a first portion 102A manufactured substantially of an conductor element 106A that rotates R. The second portion 104A is manufactured substantially of a magnetic element 108A. As the distance D between datums 110A, 112A is reduced to shorter distance D', rotation R of the first portion 102A is slowed as the conductor element 106A overlaps further with the magnetic field generated by the magnetic element 108A. In FIG. 1B, a braking system 100B includes a first portion 102B manufactured substantially of an conductor element 106B that rotates R. The second portion 104B includes a plurality of magnetic elements 108B, that are disposed substantially parallel to a leading edge 116B of the second portion 104B. As such, as the distance D between datums 110B, 112B is shortened, the rotating first portion 102B encounters a stronger magnetic field as the conductor element 106B overlaps with the plurality of magnets 108B. That is, the conductive element 106B encounters magnetic field generated by a greater number of magnetic elements 108B as the datums 110B, 112B are moved closer together. As such, heavier loads that are being applied to either the first portion 102B or the second portion 104B are subject to a higher braking force since the heavier loads bring the datums 110B, 112B closer together.

Figure 1C:
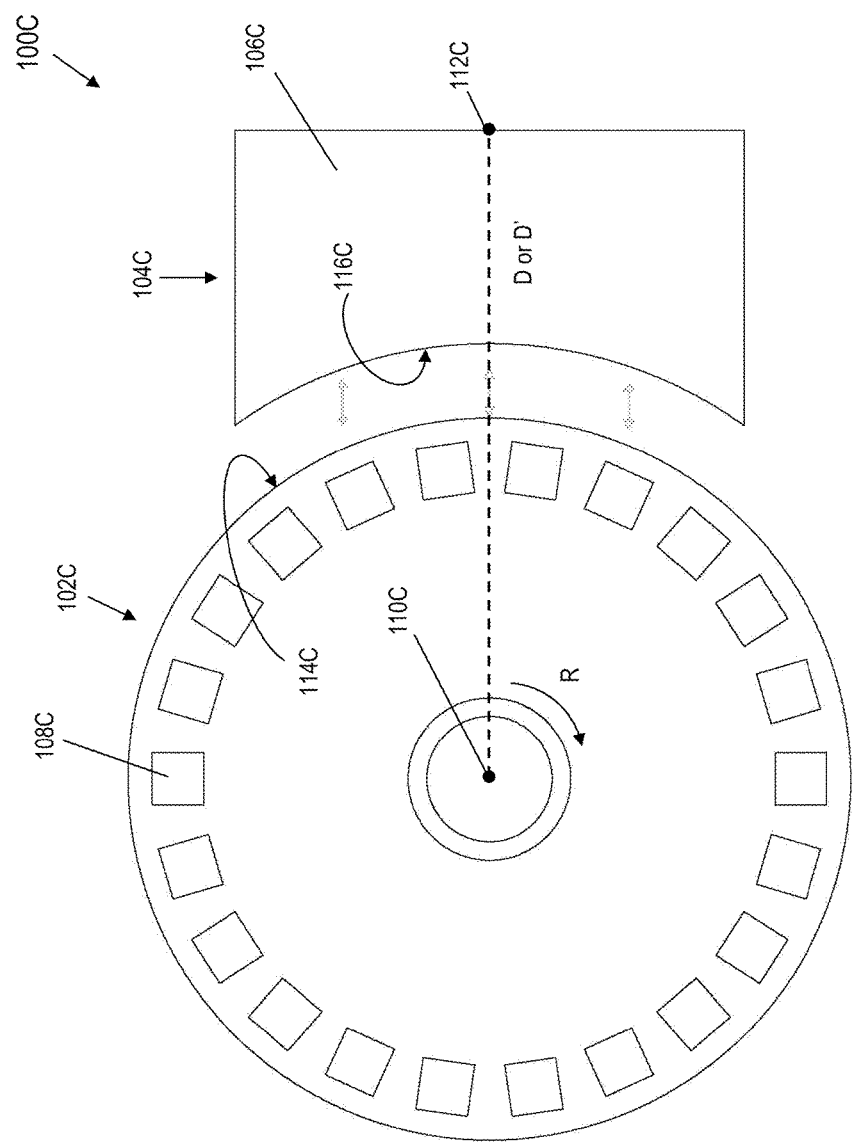

In FIG. 1C, a braking system 100C includes a first portion 102C that includes a plurality of magnetic elements 108C, and is configured for rotation R. The second portion 104C is manufactured of a conductive material 106C. As the datums 110C, 112C are moved closer together, a larger portion of the conductive element 106C encounters the magnetic fields generated by the magnetic elements 108C and braking force is increased. In FIG. 1D, a braking system 100D includes a first portion 102D manufactured substantially of an electrically conductive element 106D that rotates R. The second portion 104D includes a plurality of magnetic elements 108D that are disposed substantially parallel to a leading edge 116D of the second portion 104D, in a number of arrays 118D. As the distance D between datums 110D, 112D is shortened, the conductive element 106D encounters magnetic fields formed by a first array 118D', which applies a first braking force to slow the rotation R. Heavier loads applied to either of the first portion 102D or the second portion 104D will cause the datums 110D, 112D to move even closer together. As such, a heavier load will cause the conductive element 106D to encounter magnetic fields formed by both the first array 118D', as well a second array 118D". Even heavier loads will cause the conductive element 106D to encounter magnetic fields formed by the first array 118D', the second array 118D", and a third array 118D'". By encountering magnetic fields generated by all arrays 118D, the strongest braking force is applied to the rotating first portion 102D, thus applying greater braking forces to the system 100D when under a heaviest load.

Figure 1E:
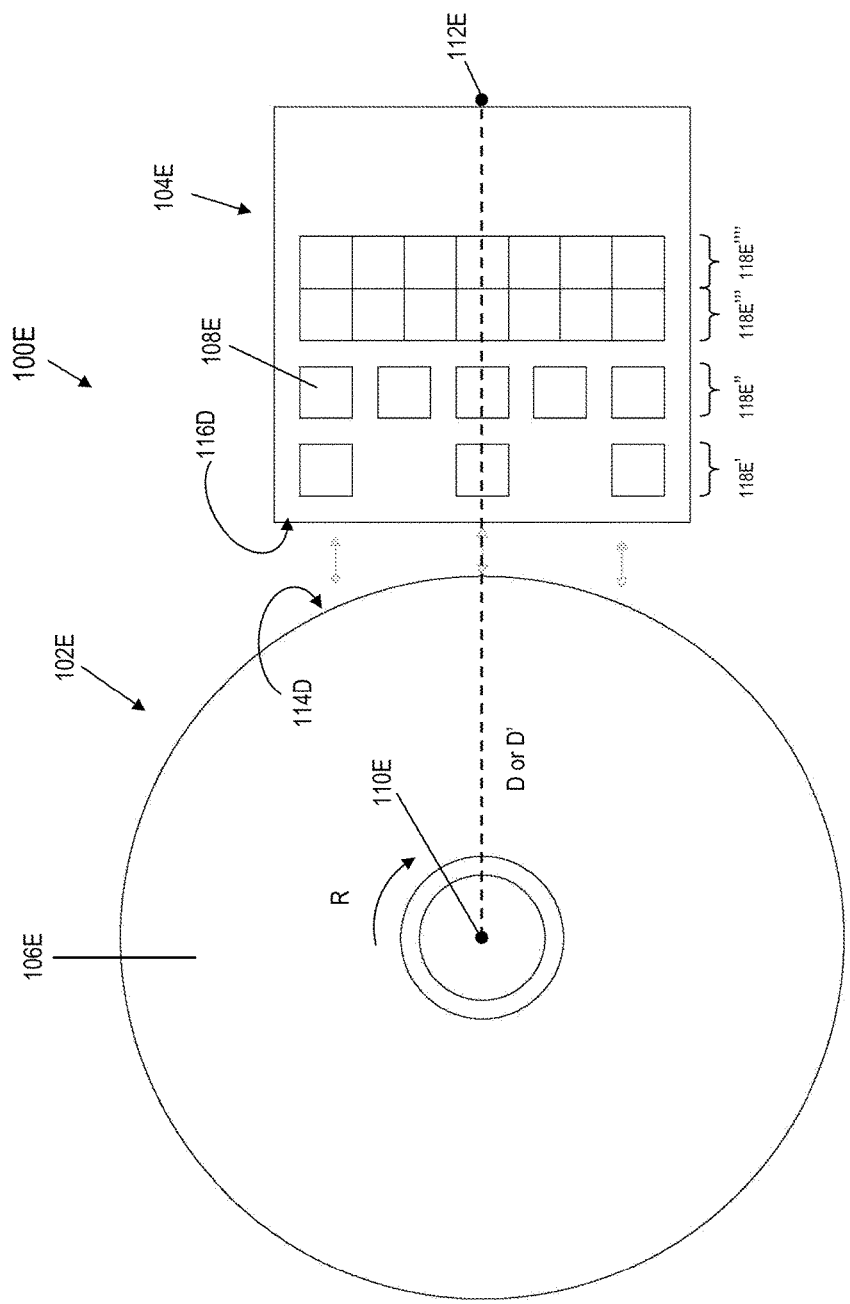

In FIG. 1E, a braking system 100E includes a first portion 102E manufactured substantially of an electrically conductive element 106E that rotates R. The second portion 104E includes a plurality of magnetic elements 108E that are disposed substantially parallel to a leading edge 116E of the second portion 104E, in a number of arrays 118E, wherein the arrays 118E contain a subset of the total number of magnetic elements 108E. Each array has a density per unit area of magnets 108E, where the area is identified by the total area of the second portion 108E bounded by the magnets 108E in the particular array 118E. As the distance D between datums 110E, 112E is decreased, the conductive element 106E encounters magnetic fields formed by a first array 118E', which applies a first braking force to slow the rotation R. Heavier loads applied to either of the first portion 102E or the second portion 104E will cause the datums 110E, 112E to move even closer. As such, a heavier load will cause the conductive element 106E to encounter magnetic fields formed by both the first array 118E', as well a second array 118E". The second array 118E" has a higher density per unit area of the second portion 104E, as apparent by the greater number of magnets 108E in the first array 118' than in the second array 118". Even heavier loads will cause the conductive element 106E to encounter magnetic fields formed by the first array 118E', the second array 118E", and a third array 118E'", which has an even greater array density. Moreover, a fourth, supplemental array 118E"" disposed adjacent the third array 118E'" provides even further braking force to slow rotation R for very heavy loads. Each array 118E is defined by an array distance or subset distance from the datum 112E. Although the arrays 118E are described with regard to derivatives thereof, the arrays may also be described with regard to a number of magnetic elements 108E per array 118E, or the total area of magnets in a particular array.

Figure 1F:
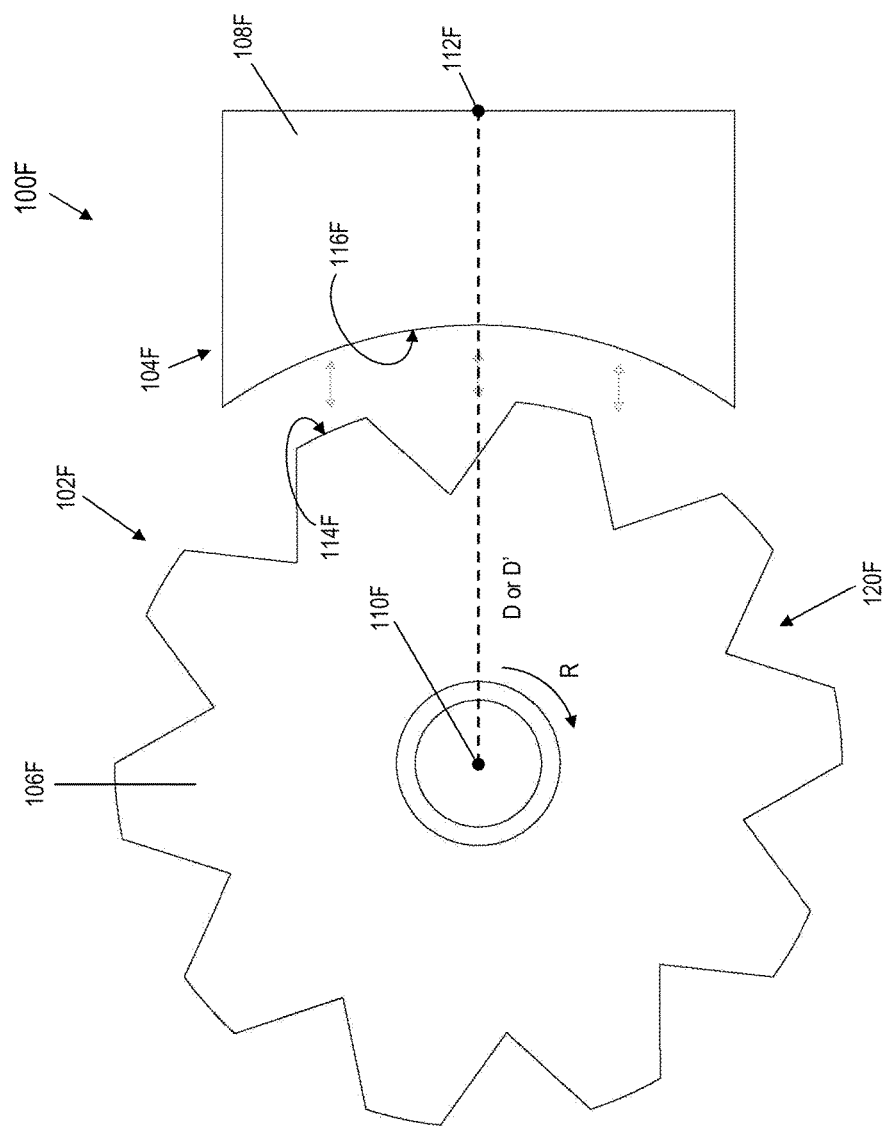

FIG. 1F depicts a braking system 100F including a first portion 102F manufactured substantially of an electrically conductive element 106F that rotates R. The second portion 104F is manufactured substantially of a magnetic element 108F. As the distance D between datums 110F, 112F is reduced to shorter distance D', rotation R of the first portion 102F is slowed as the electrically conductive element 106F is moved further into the magnetic field generated by the magnetic element 108F. Notably, a leading edge 114F is serrated or otherwise non-smooth, with a number of cut-outs 120F depicted. The cutouts 120F result in a first portion 102F having a smaller amount of conductive element 106F proximate the leading edge 114F. As such, a smaller amount of conductive element 106F enters the magnetic field generated by the magnetic element 108F under smaller loads, while heavier loads cause a greater amount of the conductive element 106F to enter the field. This controls braking force applied based on the load.

Figure 1G:
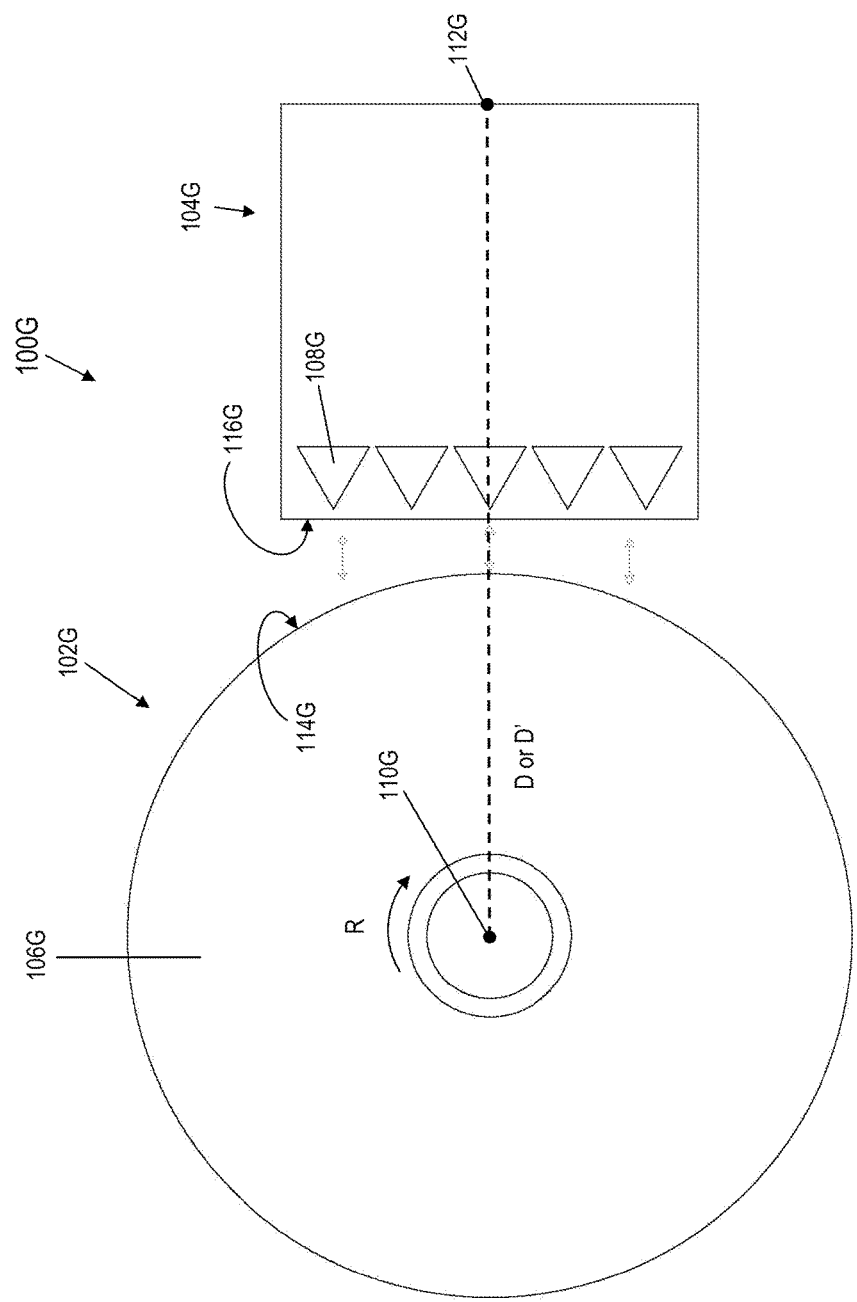

FIG. 1G depicts a braking system 100G including a first portion 102G manufactured substantially of an electrically conductive element 106G that rotates R. The second portion 104G includes a plurality of magnetic elements 108G having a shape that defines a smaller area closer to a leading edge 116G of the second portion 104G, and a greater area as the distance from the leading edge 116G increases. As the distance D between datums 110G, 112G is reduced, the conductive element 106G encounters a greater area of magnet elements 108G and, as such, a higher force produced by the magnetic fields generated therefrom. Thus, heavier loads are subject to higher braking forces.

Figure 1H:
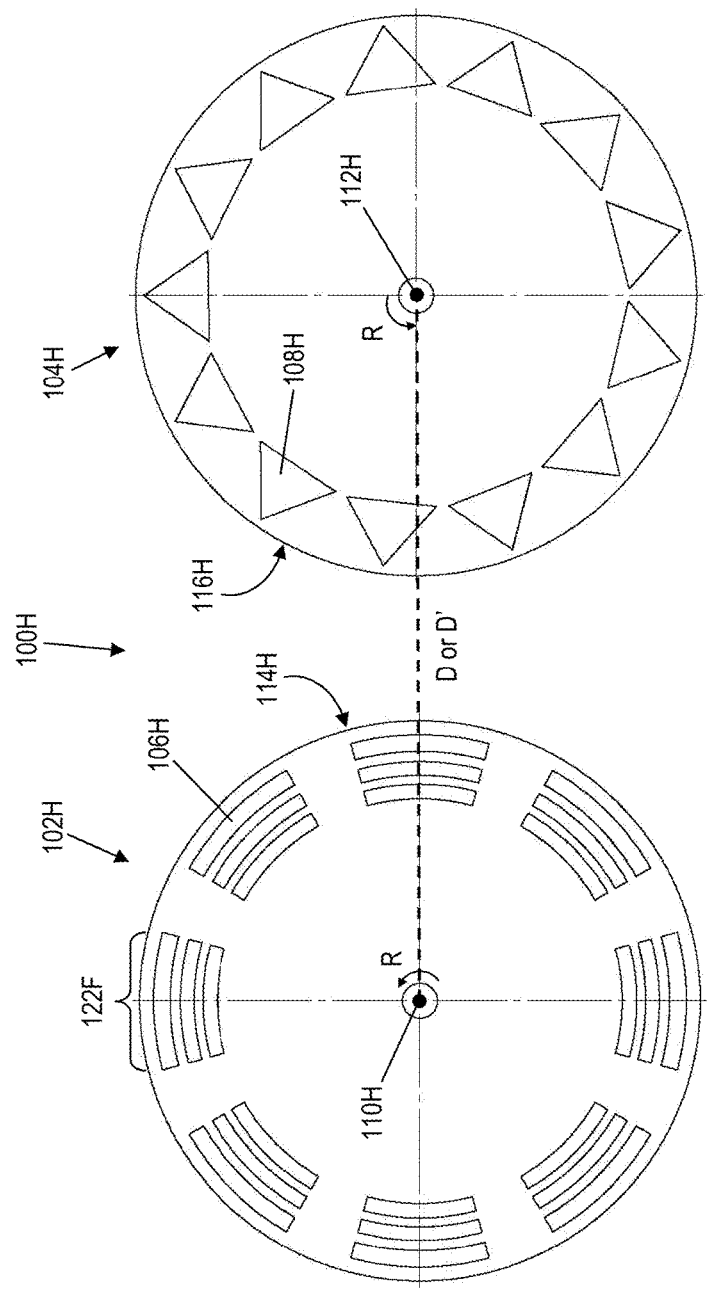

FIGS. 1A-1G depict braking systems 100 having a first portion 102 that rotates and a second portion 104 that is generally non-rotational. The technologies described herein may also be leveraged with braking systems 100H that have two rotating portions 102H, 104H, as depicted in FIG. 1H. Here, the first and second portions 102H, 104H rotate in opposite directions. The first rotating portion 102H includes a plurality of conductive elements 106H arranged in arrays 122F. The second portion 104H includes a plurality of magnetic elements 108H, having shapes that define a smaller area closer to a leading edge 116H of the second portion 104H, and a greater area as the distance from the leading edge 116H increases. As the distance D between datums 110H, 112H is reduced, the conductive elements 106H encounter a greater area of magnet elements 108H and, as such, a higher force produced by the magnetic fields generated therefrom. Thus, heavier loads are subject to higher braking forces. Some of the conductive elements 106H and the magnet elements 108H are configured such that they have smaller areas proximate the leading edges of their respective portions. As such, smaller braking forces are encountered at those smaller areas. Other shapes of such elements are contemplated. This can help further alter the dynamic range of the braking system.

The following figures depict generally eddy current braking systems that incorporate these and other examples of configurations of magnetic and electrically-conductive elements. These non-limiting examples may be further modified as will be apparent to a person of skill in the art upon reading the specification. As such, other eddy current braking systems including different magnetic element and conductive element configurations are contemplated. For example, although the following examples depict auto-belay and other fall-protection systems, other applications of the braking systems described herein are contemplated. The braking systems may be used to provide a braking force a car such as a roller coaster or train. That is, the systems can be integrated into the wheels of the car and braking systems that apply a braking force to those wheels. Vertical configurations (e.g., for elevator systems) are also contemplated. Additionally, the cable or webbing being unrolled from the drums described below can be unrolled in a horizontal configuration (e.g., on a zipline system, or other substantially linear conveyance system). Such systems can include loading and unloading systems for the movement of goods from cargo vessels, and so on.

Figure 2A:
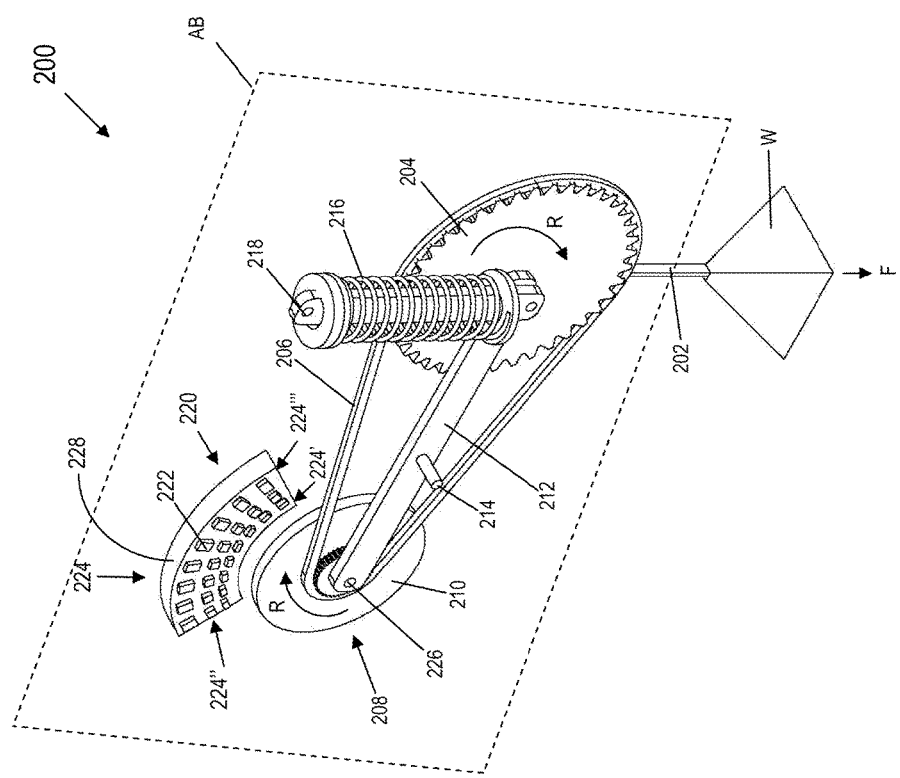
FIGS. 2A and 2B depict perspective and side views, respectively, of an eddy current braking system in accordance with an example of the technology.
Figure 2B:
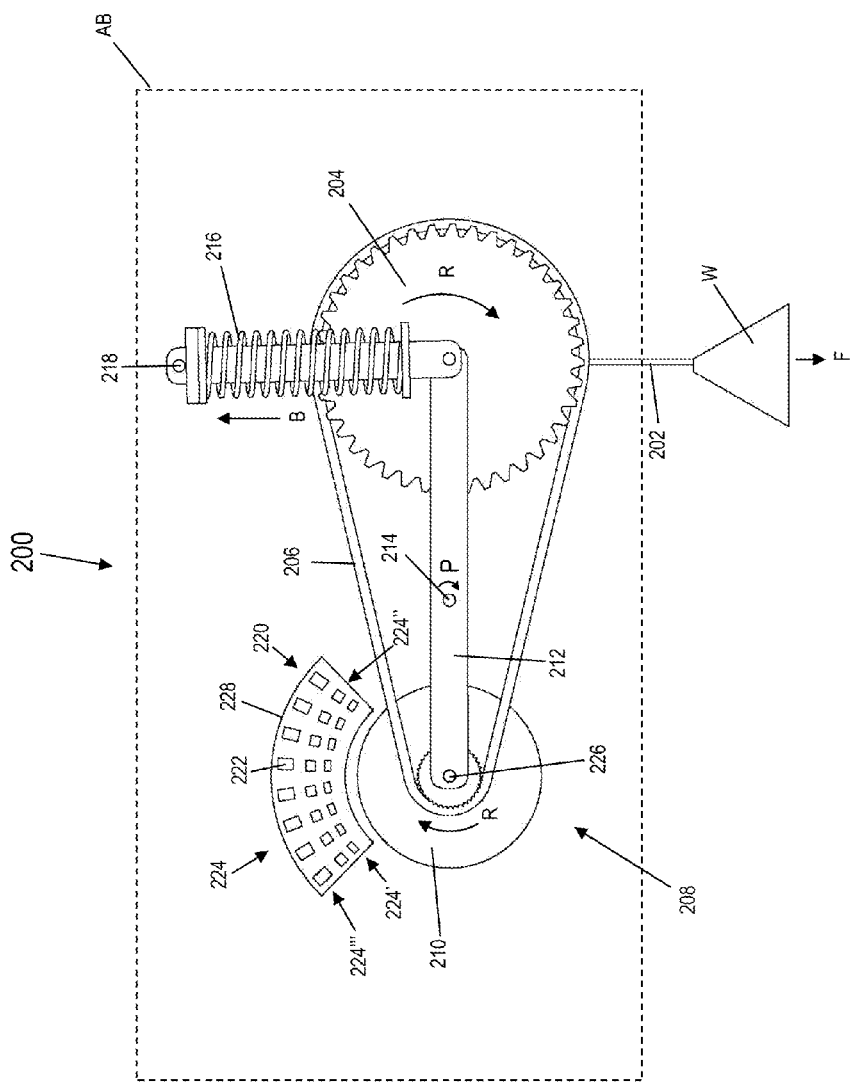

FIGS. 2A and 2B depict perspective and side views, respectively, of an eddy current braking system 200 in accordance with an example of the technology. FIGS. 2A and 2B are described simultaneously. The eddy current braking system 200 may be utilized in any system that requires braking forces, e.g., to slow and/or stop the fall of a weight or load. For example, the eddy current braking system 200 may be utilized in an autobelay device that is used for climbing, fall-protection, or other systems. Such an autobelay device is depicted generally in FIGS. 2A and 2B as dashed box AB. The device AB includes a drum (hidden in FIGS. 2A and 2B) having wrapped there around a webbing, cable, or other elongate element 202. A weight W (e.g., a climber) applies a force F on the webbing 202. The force F unwraps the webbing 202 by rotating the drum. A drum gear 204 fixed to the drum rotates R, and that rotation R is transferred via a chain and gear, cable and pulley, or other transmission 206 to a corresponding first portion 208 manufactured of a conductive element 210, which also rotates R. The first portion 208 and the drum gear 204 (as well as the drum) are connected via a linkage 212 that has a fixed pivot point 214.

A biasing element 216 is fixed at an anchor 218 and connected at an opposite end to the linkage 212 and drum gear 204 so as to bias the drum gear 204 (upward in the depicted FIGS. 2A and 2B). As described herein, biasing elements may include compression springs, torsion springs, extension springs, gas cylinders, electromagnetic devices, and so on. Additionally, a biasing force B provided by the biasing elements in the various examples depicted herein may be adjustable. In that regard, a user could further tune the biasing force B for an autobelay device based at least in part on a weight of the user, a desired fall rate, and other factors. As the weight W applies a force F to the webbing 202, the linkage pivots P about the fixed pivot point 214. This, in turn, moves the first portion 208 proximate a second portion 220 having a fixed position, which includes a plurality of magnets 222 disposed in an array 224 thereon. Lighter weights W that generate lower forces F may only move the first portion 208 proximate a first portion 224' of the magnet array 224. Each of the first portion 208 and the second portion 220 include a datum 226, 228, respectively. Datum 226 is an axle around which the first portion 208 rotates. Heavier weights may generate forces further reduce the distance between the first datum 226 and the second datum 228, thus moving the conductive material 210 closer to the second 224" and third portions 224''' of the array 224. As such, heavier weights W are subjected to stronger braking forces to more effectively slow the weight W.

Figure 3:
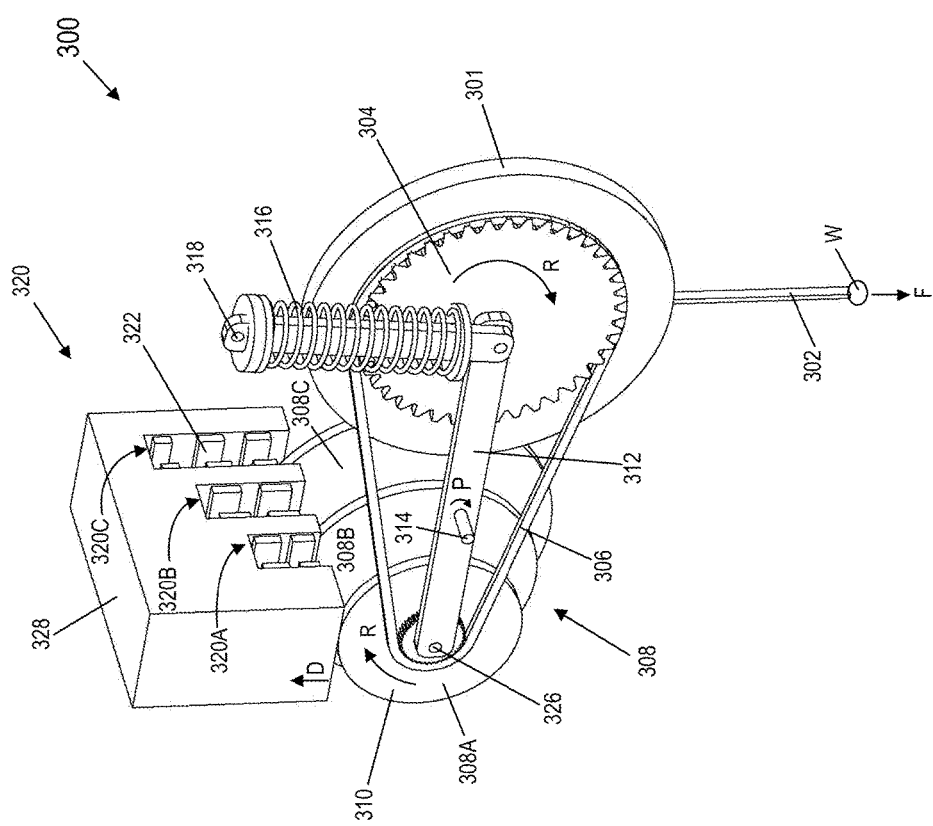
FIG. 3 depicts a perspective view of an eddy current braking system in accordance with another example of the technology.

FIG. 3 depicts a perspective view of an eddy current braking system 300 in accordance with another example of the technology. The eddy current braking system 300 may be utilized in any system that requires braking forces, e.g., an autobelay device as described above, but not depicted in FIG. 3. The system 300 used in the autobelay device includes a drum 301 having wrapped there around a webbing, cable, or other elongate element 302. A weight W applies a force F on the webbing 302, which unwraps the webbing 302 by rotating the drum 301. A drum gear 304 fixed to the drum 301 rotates R, and that rotation R is transferred via a transmission 306 to a corresponding first portion 308. Here, the first portion 308 includes a plurality of discrete disks 308A, 308B, 308C, each configured to rotate R together. Each disk 308A, 308B, 308C is manufactured of a conductive element 310. The first portion 308 and the drum 301 are connected via a linkage 312 that has a fixed pivot point 314. A biasing element 316 is fixed at an anchor 318, and connected at an opposite end to the linkage 312 and drum 301 so as to bias the drum 301 upward. As the weight W applies a force F to the webbing 302, the linkage pivots P about the fixed pivot point 314. This, in turn, moves the first portion 308 proximate a second portion 320 having a fixed position. The second portion 320 defines a plurality of channels 320A, 320B, 320C. Each channel 320A, 320B, 320C includes a plurality of magnets 322 disposed on either side of the respective channel 320A, 320B, 320C. The channels 320A, 320B, 320C are configured to receive a respective one of the discrete disks 308A, 308B, 308C as the first portion 308 moves proximate the second portion 320. While three channels and disks are depicted, other examples may utilize only a single channel or more than three channels. Lighter weights W that generate lower forces F may only move the first portion 308 proximate a first distance D into the second portion 320. Each of the first portion 308 and the second portion 320 include a datum 326, 328, respectively. Datum 326 is an axle around which the first portion 308 rotates. Heavier weights may generate forces that further reduce the distance between the first datum 326 and the second datum 328, thus moving the conductive material 310 further into the second portion 320. As such, heavier weights W are subjected to stronger braking forces to more effectively slow the weight W. Heavier weights may generate forces to move the disks 308A, 308B, 308C deeper into the channels 320A, 320B, 320C, so as to subject the conductive element 310 to more magnetic fields generated by the magnets 322. As such, heavier weights W are subjected to stronger braking forces to more effectively slow the weight W.

Figure 4A:
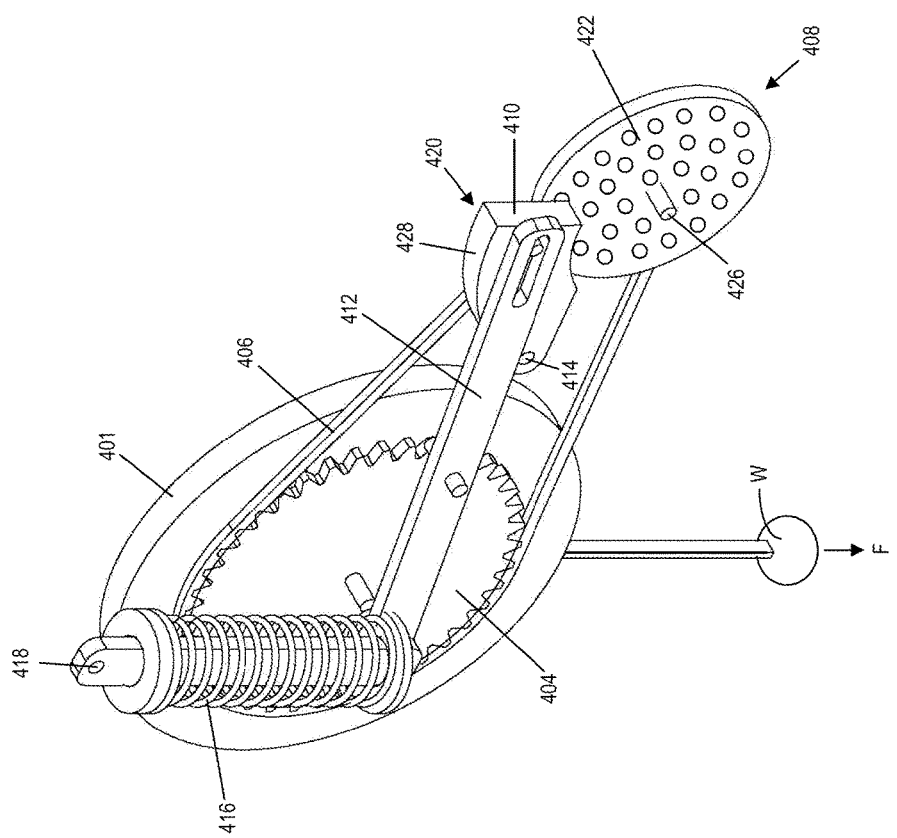
FIGS. 4A and 4B depict perspective and side views, respectively, of an eddy current braking system in accordance with an example of the technology.
Figure 4B:
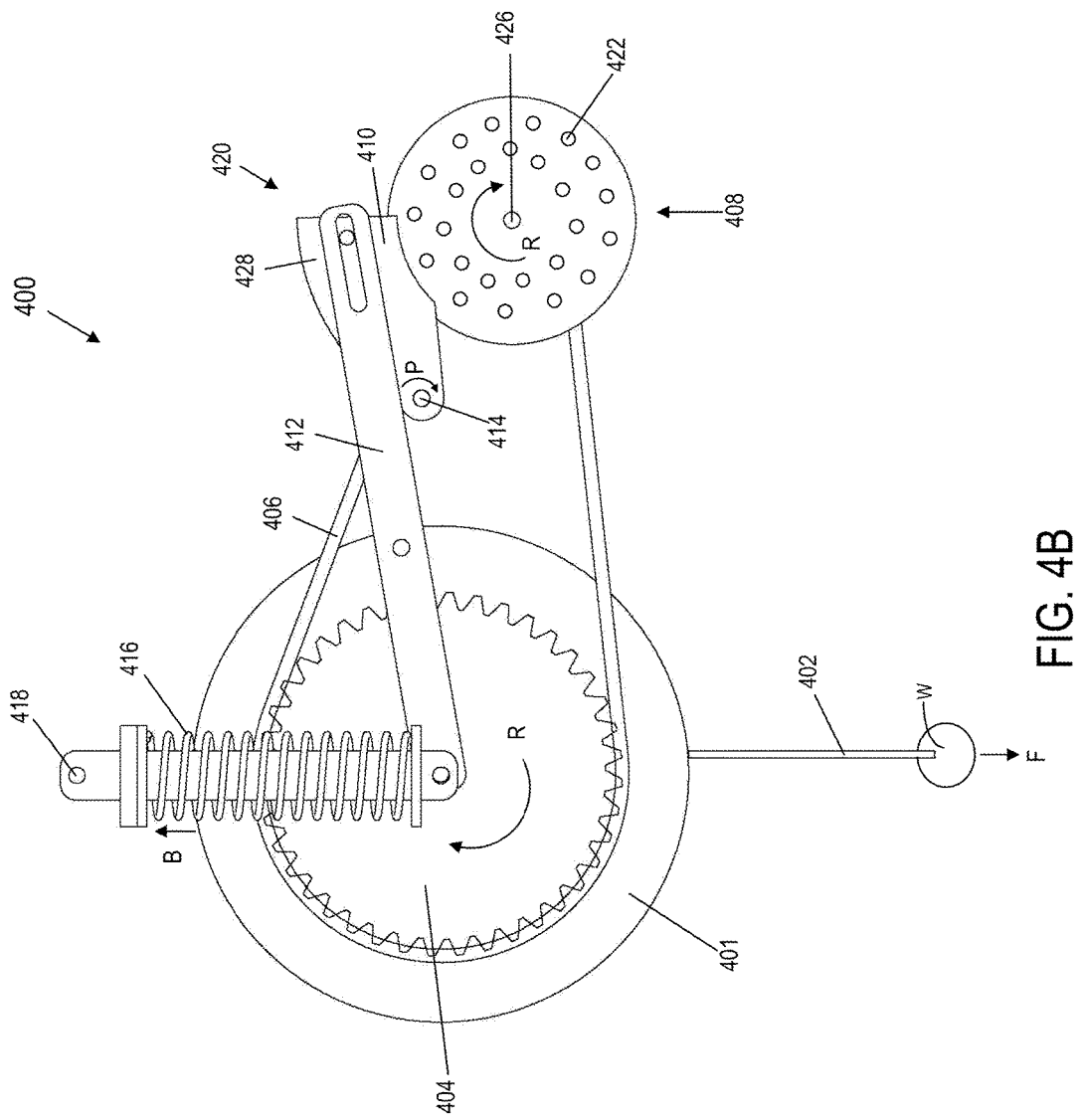

FIGS. 4A and 4B depict perspective and side views, respectively, of an eddy current braking system 400 in accordance with an example of the technology. FIGS. 4A and 4B are described simultaneously. The eddy current braking system 400 may be utilized in any system that requires braking forces, e.g., an autobelay device, which is not depicted in FIGS. 4A and 4B. The system 400 includes a drum 401 having wrapped there around a webbing 402. A weight W applies a force F on the webbing 402, which unwraps the webbing 402 by rotating the drum 401. A drum gear 404 fixed to the drum rotates R, and that rotation R is transferred via a transmission 406 to a corresponding first portion 408 that includes thereon a number of magnets 422 and also rotates R. The drum 401 and drum gear 404 are connected via a linkage 412 to a second portion 420, which is manufactured of a conductive element 410. Upon movement of the linkage 412, the second portion 420 pivots P about a fixed pivot point 414. A biasing element 416 is fixed at an anchor 418 and connected at an opposite end to the linkage 412 and drum gear 404, so as to bias the drum gear 404 (upward in the depicted FIGS. 4A and 4B). As the weight W applies a force F to the webbing 402, the linkage 412 pivots P the second portion 420 about the fixed pivot point 414. This, in turn, moves the second portion 420 further from the first portion 408 having a fixed position. Lighter weights W that generate lower forces F may only move the second portion 420 slightly away from the first portion 408. Each of the first portion 408 and the second portion 420 include a datum 426, 428, respectively. Datum 426 is an axle around which the first portion 408 rotates. Heavier weights may generate forces that further increase the distance between the first datum 426 and the second datum 428, thus moving the conductive material 410 further from a greater number of magnets 422. As such, heavier weights W are subjected to lesser braking forces to less effectively slow the weight W. A knurled knob 430 that is rotatable on a threaded rod that attaches to the anchor and is disposed proximate the anchor 418 for adjusting a biasing force of the spring 416.

Figure 5A:
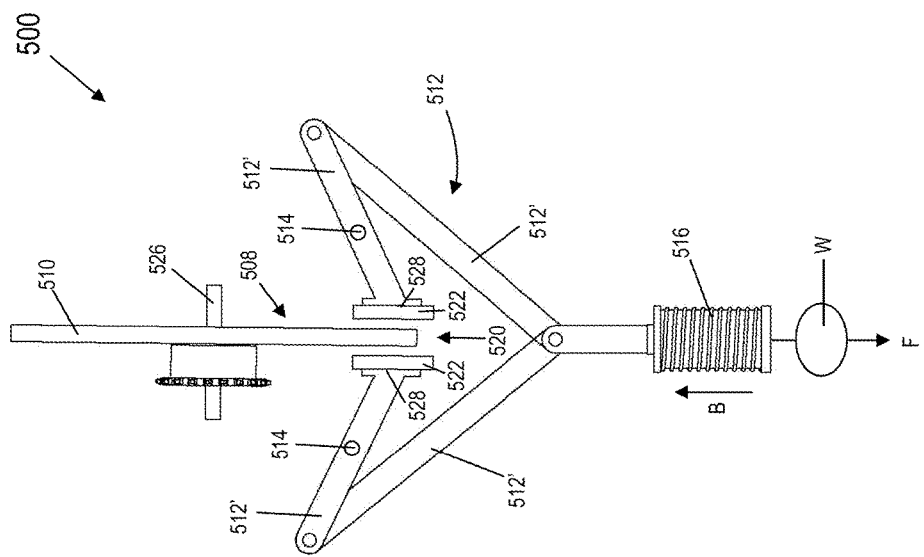
FIGS. 5A and 5B depict end views of eddy current braking systems in accordance with examples of the technology.
Figure 5B:
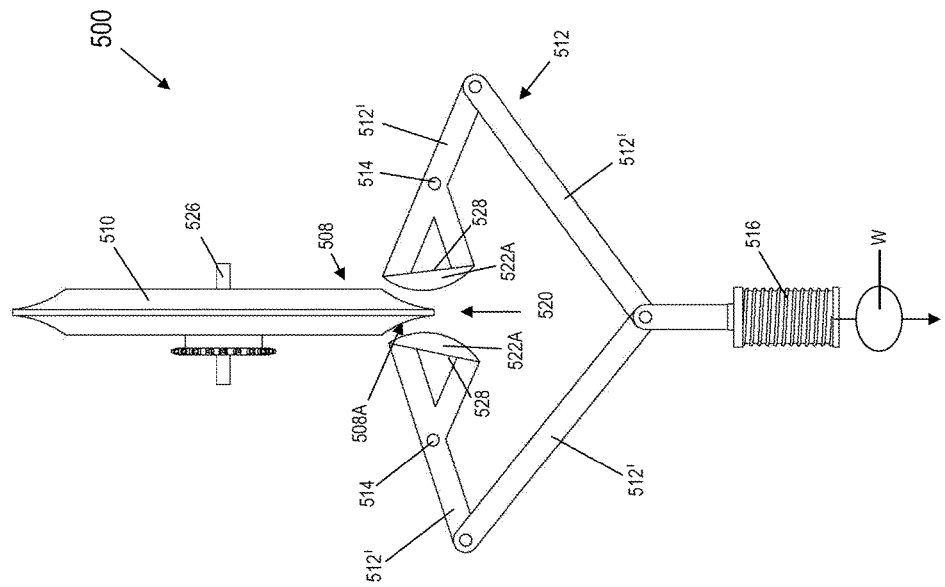

FIGS. 5A and 5B depict end views of eddy current braking systems 500 in accordance with examples of the technology. FIGS. 5A and 5B are described simultaneously, although specific structural differences are noted. Each eddy current braking system 500 may be utilized in any system that requires braking forces. A weight W applies a force F on a linkage 512 that includes a plurality of bars 512' that pivot about a fixed pivot point 514. A first portion 508 is manufactured of a conductive element 510 and configured for rotation R about a datum 526. A biasing element 516 is connected to the linkage 512 so as to bias a second portion 520, which includes a plurality of magnets 522. As the weight W applies a force F to the linkage 512, the linkage arms 512 pivot P about the fixed pivot points 514. This, in turn, moves the second portion 520 proximate the first portion 508. Each of the first portion 508 and the second portion 520 include a datum 526, 528, respectively. Datum 526 is an axle around which the first portion 508 rotates. Heavier weights may generate forces further reduce the distance between the first datum 526 and the second datum 528, thus moving the magnets 522 closer to the conductive material 510. As such, heavier weights W are subjected to stronger braking forces to more effectively slow the weight W. FIG. 5A depicts a conductive element 510 disposed substantially parallel to parallel magnet elements 522. FIG. 5B, on the other hand, depicts a conductive element 510 having a tapered outer edge 508A configured to interact with substantially curved magnets 522A.

Figure 6A:
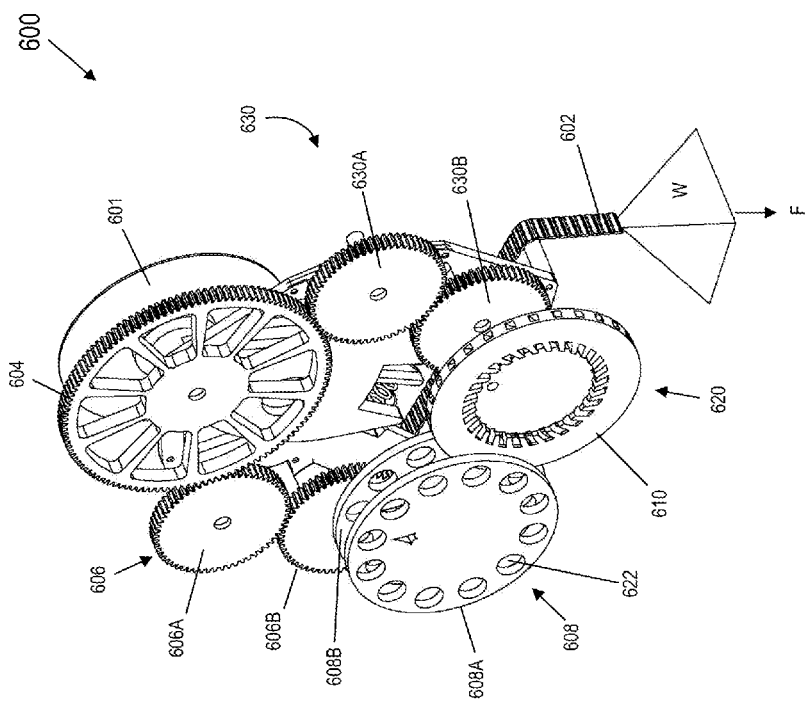
FIGS. 6A and 6B depict perspective and side views, respectively, of an eddy current braking system in accordance with an example of the technology.
Figure 6B:
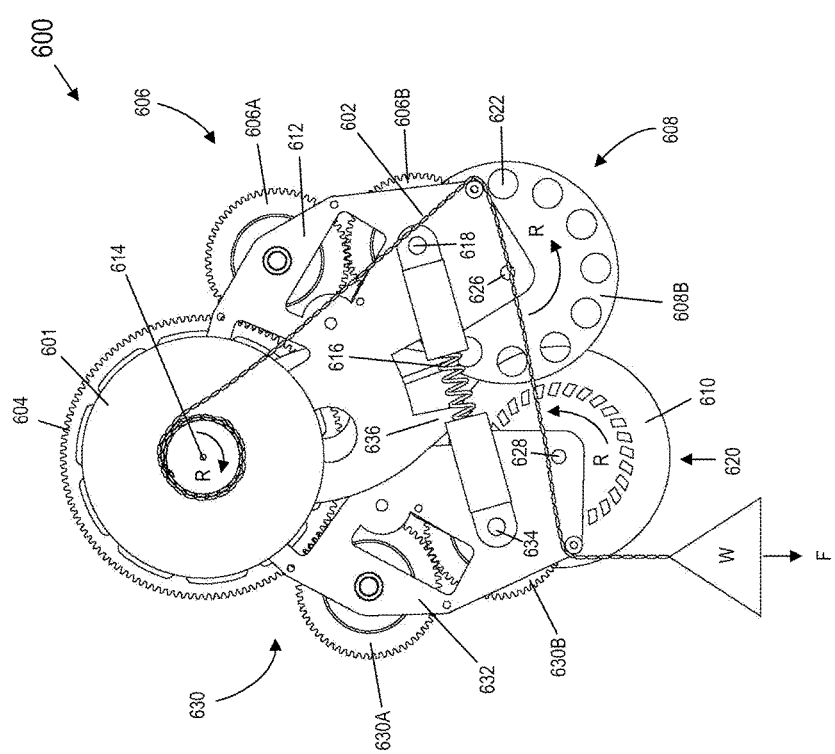

FIGS. 6A and 6B depict perspective and side views, respectively, of an eddy current braking system 600 in accordance with an example of the technology. FIGS. 6A and 6B are described simultaneously and depict a system 600 having two rotating elements. The eddy current braking system 600 may be utilized in any system that requires braking forces, e.g., an autobelay device as described above, but not depicted in FIGS. 6A and 6B. The system 600 used in the autobelay device includes a drum 601 having wrapped there around a webbing 602. A weight W applies a force F on the webbing 602, which unwraps the webbing 602 by rotating the drum 601. A drum gear 604 fixed to the drum 601 rotates R, and that rotation R is transferred via a transmission 606, which includes a plurality of gears 606A, 606B, as depicted, to a corresponding first portion 608. Here, the first portion 608 includes a plurality of discrete disks 608A, 608B, each configured to rotate R together. Each disk 608A, 608B is includes a number of magnets 622. The first portion 608 and the drum 601 are connected via a linkage 612 that has a fixed pivot point 614, which is an axle about which the drum 601 rotates. Rotation of the drum 601 also transfers rotation R via a transmission 630, which includes a plurality of gears 630A, 630B, as depicted, to a corresponding second portion 620. The second portion 620 is manufactured of a conductive material 610 and is configured to rotate R. The second portion 620 and the drum 601 are connected via a linkage 632 that shares the fixed pivot point 614. Each of the first portion 608 and the second portion 620 include a datum 626, 628, respectively.

A biasing element 616 is fixed at an anchor 618 to the first linkage 612 and fixed at an anchor 634 to the second linkage 632, so as to bias the datums 626, 628 away from each other. As the weight W applies a force F to the webbing 602, the linkages 612, 632 pivot about the fixed pivot point 614. This, in turn, compresses the biasing element 616 so as to move the datums 626, 628 closer to each other. As such, the second portion 620 moves between the disks 608A, 608B of the first portion 608. Heavier weights may generate forces that further reduce the distance between the first datum 626 and the second datum 628, thus moving the conductive material 610 deeper into the magnetic field created by the magnets 622. As such, heavier weights W are subjected to stronger braking forces to more effectively slow the weight W. A positive stop mechanism formed as a bar 636 extending from the linkage 612 controls the overlap of the magnetic field and the conductor element 610 and prevents contact between the first portion 608 and the second portion 620.

Figure 7A:
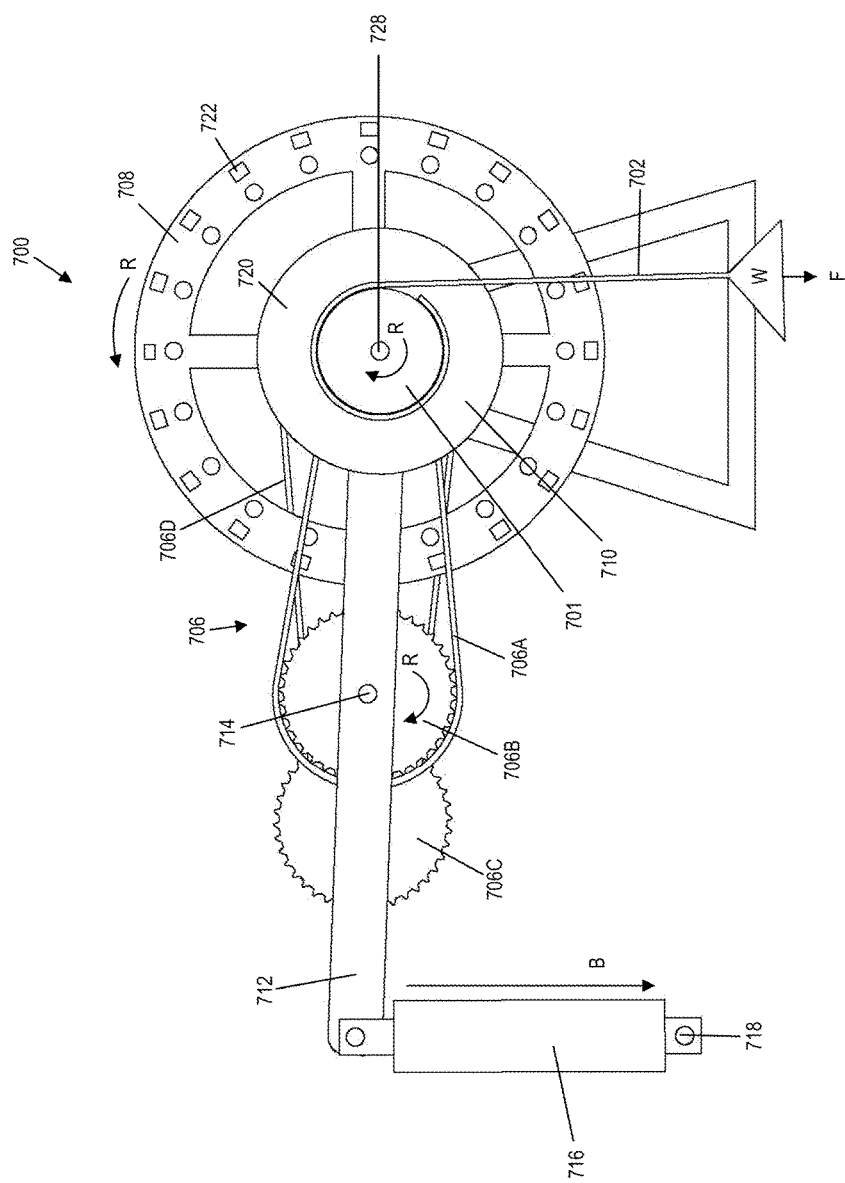
FIGS. 7A and 7B depict side views of an eddy current braking system in accordance with an example of the technology, in a first position and a second position, respectively.
Figure 7B:
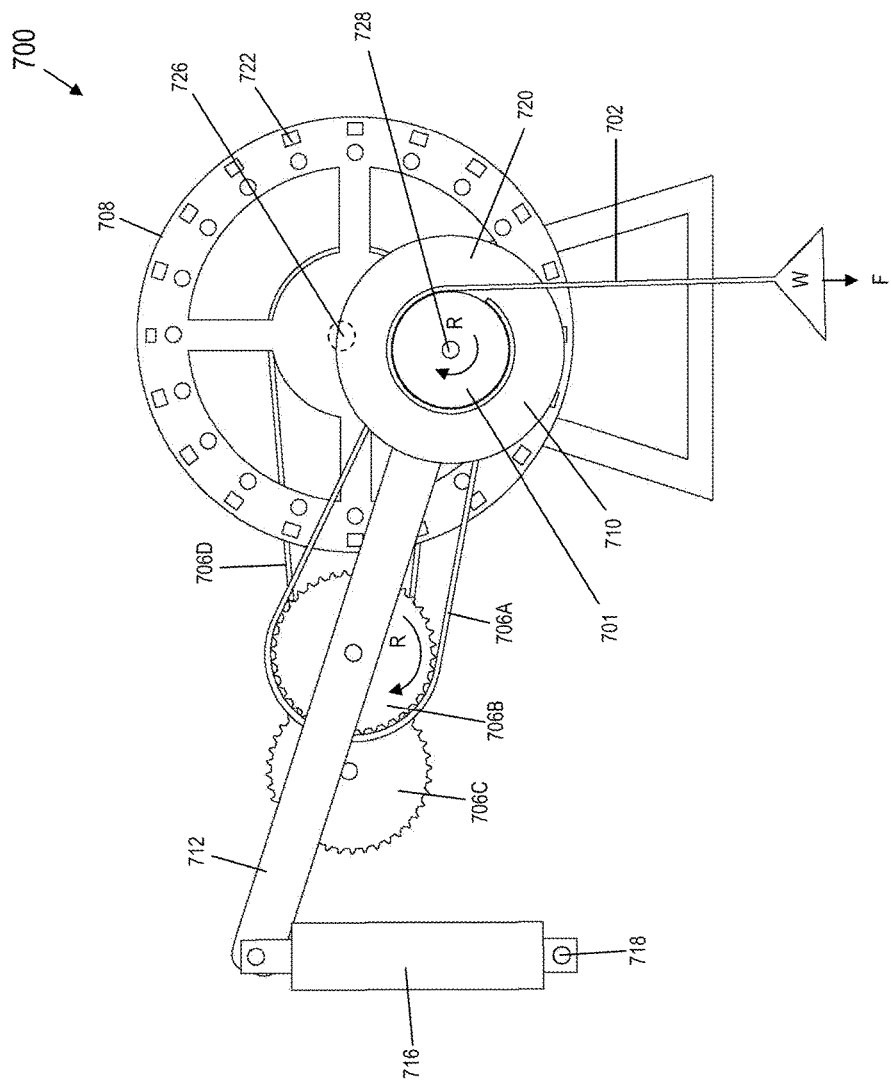

FIGS. 7A and 7B depict side views of an eddy current braking system 700 in accordance with an example of the technology, in a first position and a second position, respectively. FIGS. 7A and 7B are described simultaneously and depict a system 700 having two rotating elements. The eddy current braking system 700 may be utilized in any system that requires braking forces, e.g., an autobelay device as described above, but not depicted in FIGS. 7A and 7B. The system 700 used in the autobelay device includes a drum 701 having wrapped there around a webbing 702. A weight W applies a force F on the webbing 702, which unwraps the webbing 702 by rotating R the drum 701. A drum gear (hidden in FIGS. 7A and 7B) fixed to the drum 701 rotates, and that rotation R is transferred via a transmission 706, to a corresponding first portion 708. Here, the transmission 706 includes a first chain 706A which rotates R a first gear 706B. The first gear 706B transfers rotation to a second gear 706C, which in turn drives a second chain 706D that turns the first portion 708. Here, the first portion 708 is configured to rotate R and includes a number of magnets 722. Rotation of the drum 701 also rotates a second portion 720 that is manufactured of a conductive material 710. In a first position (as depicted in FIG. 7A) the second portion 720 has a datum 728 substantially aligned with a datum 726 of the first portion 708.

The second portion 720 and the drum 701 are connected via a linkage 712 to a biasing element 716 that is fixed at an anchor 718. The linkage 712 has a fixed pivot point 714. The biasing force B biases datums 726, 728 into the position of FIG. 7A where they are substantially aligned. As the weight W applies a force F to the webbing 702, the linkage 712 pivots about the fixed pivot point 714. This force F opposes the biasing force B of the biasing element 716 so as to move the datums 726, 728 away from each other, as depicted in FIG. 7B. As such, the second portion 720 moves closer to the magnets 722 disposed on the first portion 708. Heavier weights may generate forces that further increase the distance between the first datum 726 and the second datum 728, thus moving the conductive material 710 closer to the magnetic field created by the magnets 722. As such, heavier weights W are subjected to stronger braking forces to more effectively slow the weight W.

Figure 8A:
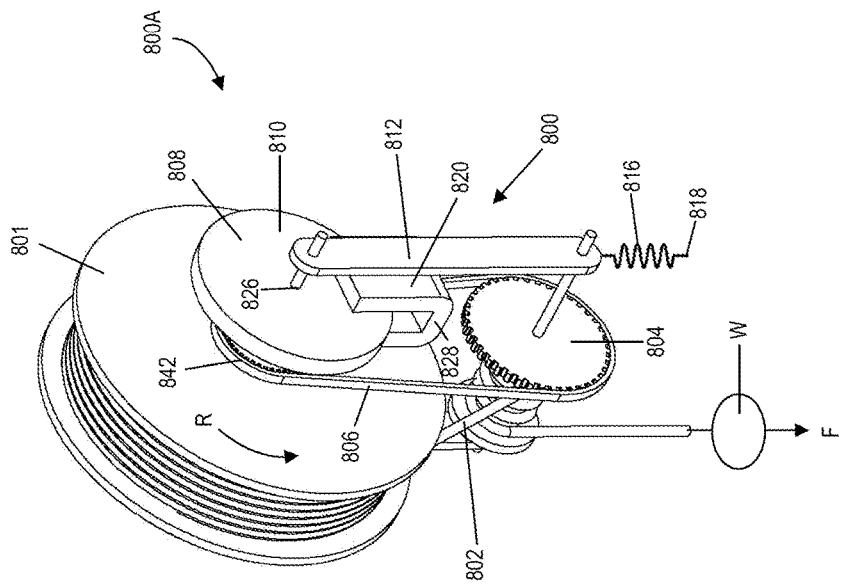
FIGS. 8A and 8B depict perspective and end views, respectively, of an eddy current braking system in accordance with an example of the technology.
Figure 8B:
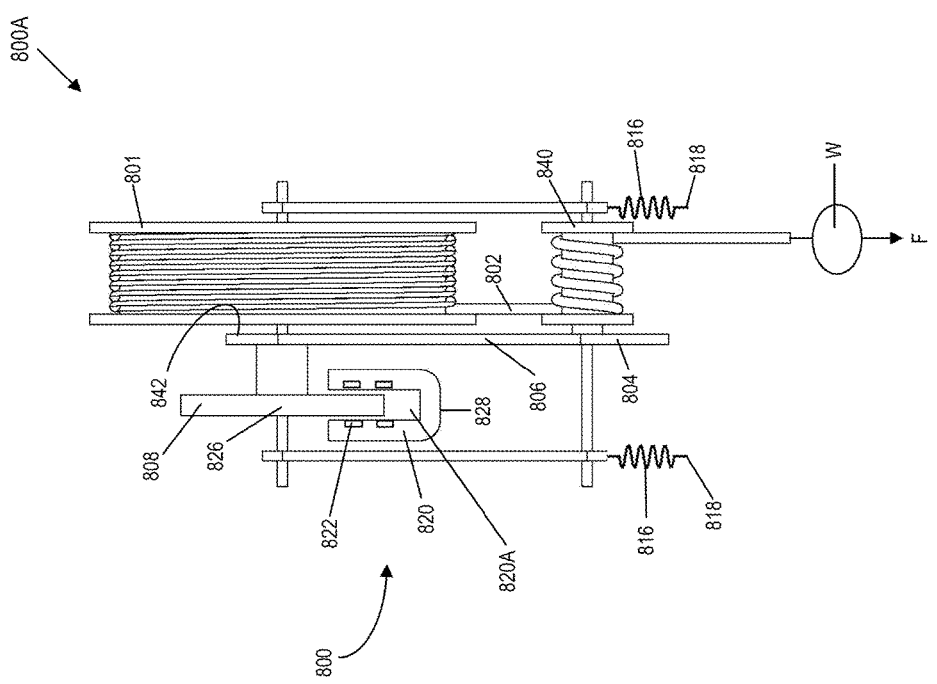

FIGS. 8A and 8B depict perspective and end views, respectively, of an eddy current braking system 800 in accordance with an example of the technology. More specifically, the eddy current braking system 800 is used in conjunction with a windlass 800A. The windlass 800A includes a drum 801 having wrapped there around an elongate element such as a rope 802. Upon exiting the drum 801, the rope 802 is wound around a capstan 840. A weight W applies a force F on the rope 802, which unwraps the rope 802 by rotating both the capstan 840 and the drum 801. A capstan gear 804 fixed to the capstan 840 rotates R, and that rotation R is transferred via a transmission 806 and first element gear 842. Rotation of the first element gear 842 rotates a first portion 808. Here, the first portion 808 is manufactured of a conductive element 810. The first portion 808 and the capstan 840 are connected via a linkage 812. A biasing element 816 is fixed at an anchor 818 and connected at an opposite end to the linkage 812, so as to bias the capstan 840 and first portion 808 upward. As the weight W applies a force F to the rope 802, the biasing element 816 is compressed. This, in turn, moves the first portion 808 proximate a second portion 820 that has a fixed position. The second portion 820 defines a channels 820A that includes a plurality of magnets 822 disposed on either side of the channel 820A. The channel 820A is configured to receive the first portion 808 as it moves proximate the second portion 820. Each of the first portion 808 and the second portion 820 include a datum 826, 828, respectively. Datum 826 is an axle around which the first portion 808 rotates. Heavier weights may generate forces that further reduce the distance between the first datum 826 and the second datum 828, thus moving the conductive material 810 deeper into the channel 820A, so as to subject the conductive element 810 to more magnetic fields generated by the magnets 822. As such, heavier weights W are subjected to stronger braking forces to more effectively slow the weight W.

Figure 9:
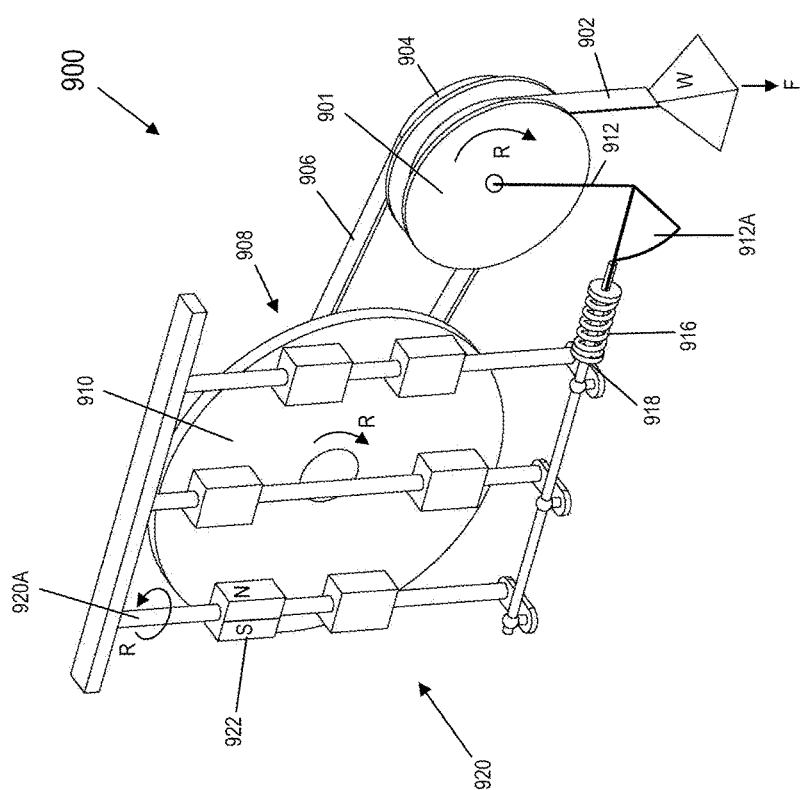
FIG. 9 depicts a side view of an eddy current braking system in accordance with another example of the technology.

FIG. 9 depicts a side view of an eddy current braking system 900 in accordance with another example of the technology. The eddy current braking system 900 may be utilized in any system that requires braking forces, e.g., an autobelay device. The system 900 includes a drum 901 having wrapped there around a webbing 902. A weight W applies a force F on the webbing 902. The force F unwraps the webbing 902 by rotating the drum 901. A drum gear 904 fixed to the drum 901 rotates R, and that rotation R is transferred via a transmission 906 to a corresponding first portion 908 manufactured of a conductive element 910, which also rotates R. A linkage 912 connects the drum 901 to a second portion 920, which includes a plurality of magnets 922. The linkage 912 is depicted includes a cam 912A, but gears, levers, or other structure may be utilized, as would be apparent to a person of skill in the art.

A biasing element 916 is fixed at an anchor 918 and connected at an opposite end to the linkage 912 so as to position the second portion 920 such that the magnets 922 are oriented in a first orientation. As the weight W applies a force F to the webbing 902, the linkage 912 changes a position of the second portion 920 (more specifically, changes an orientation of the magnets 922 by rotating R a shaft 920A). When unloaded by weight W, the magnets 922 may be in an orientation such that the magnetic field generated thereby does not form a braking force on the conductive element 910. Lighter weights W that generate lower forces F may only rotate the shaft 920A and magnets 922 slightly, so a lower magnetic force is applied to the rotating conductive element 910. Heavier weights may generate forces that further rotate the shaft 920A and magnets 922, so a higher magnetic force is applied to the rotating conductive element 910. As such, heavier weights W are subjected to stronger braking forces to more effectively slow the weight W.

Figure 10:
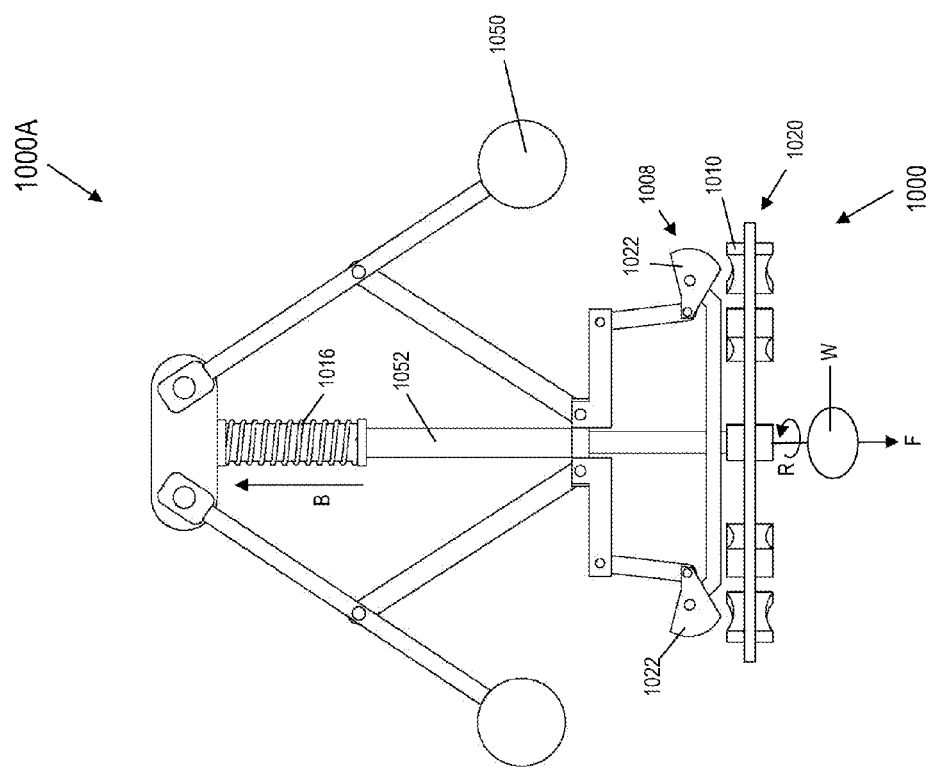
FIG. 10 depicts a side view of an eddy current braking system in accordance with another example of the technology.

FIG. 10 depicts a side view of an eddy current braking system 1000 in accordance with another example of the technology. Here, the system 1000 is incorporated into a centrifugal governor 1000A. A weight W applies a force F that opposes a biasing force B that keeps counterweights closer to a shaft 1052 of the governor 1000A. Thus, as a rotation R is applied to the shaft 1052, e.g., by paying out webbing disposed about a drum (not shown), a first portion 1008 including a plurality of magnetic elements 1022 rotates about the shaft 1052. A second portion 1020 including a number of discrete conductive materials 1010 provides a braking force to counter the rotation R.

FIG. 11 depicts a method 1100 of operating an eddy current braking system in accordance with an example of the technology. The method begins with operation 1102, where a first portion is positioned at a first distance from a second portion. The portions can be as described above in the various examples, or as otherwise configured as would be apparent to a person of skill in the art. The portions generally include respective datums that can be used to quantify the distance therebetween. In operation 1004, a weight force is applied to a linkage connecting the first and second portions. This weight force changes a position of one of the datums relative to the other. As such, the positions of the two portions change, thereby adjusting a braking force applied to the weight.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods, devices, and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

This disclosure described some examples of the present technology with reference to the accompanying drawings, in which only some of the possible examples were shown. Other aspects may, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope and spirit of the present technology. Therefore, the specific structure, acts, or media are disclosed only as illustrative examples. The scope of the technology is defined by the following claims and any equivalents therein.

What is claimed is:

1. A magnetic braking system comprising:
   a magnetic element;
   a conductive element, wherein the conductive element is spaced apart from the magnetic element, wherein one or both of the magnetic element and the conductive element is moveably displaceable from a first distance to a second distance based on an application of a weight applied on the one or both of the magnetic element and the conductive element, and wherein the applied weight generates the second distance; and
   a biasing element, wherein the one or both of the magnetic element and the conductive element is biased toward the first distance via the biasing element, wherein the biasing element is differentially overcome upon application of the weight to move the one or both of the magnetic element and the conductive element toward the second distance, and wherein heavier weights generate stronger braking forces.

2. The magnetic braking element of claim 1, wherein the conductive element is spaced apart from the magnetic element by a gap, and wherein the gap is constant between the first distance and the second distance.

3. The magnetic braking element of claim 2, wherein one or both of the magnetic element and the conductive element is rotatable.

4. The magnetic braking element of claim 3 further comprising a rotatable drum, wherein the rotatable drum is drivingly coupled to either the rotatable magnetic element or the rotatable conductive element, and wherein the weight is applied to the rotatable drum.

5. A magnetic braking system for generating a braking force by means of moving one or both of a magnetic element and a conductive element in proximity with each other, the system comprising:
   a rotatable first portion having either the magnetic element or the conductive element;
   a second portion having the other one of the magnetic element or the conductive element, wherein the second portion is spaced apart on a different plane from the first portion such that a gap is formed therebetween; and
   a biasing element coupled to the first portion or the second portion for biasing the first portion and the second portion towards a first distance separated from each other, wherein one or both of the first portion and the second portion is movable from the first distance to a second distance based on an application of a weight against a biasing force of the biasing element, and wherein the braking force applied to the system varies with the applied weight and stronger braking forces are generated for heavier applied weights.

6. The magnetic braking system of claim 5, wherein the gap is equal in the first distance and in the second distance.

7. The magnetic braking system of claim 5, wherein the gap changes from the first distance to the second distance such that in the second distance the first portion is at a closer gap distance to the second portion.

8. The magnetic braking system of claim 5, wherein the biasing element is coupled to the first portion for biasing the first portion towards the first distance, wherein the applied weight generates the movement of the first portion relative to the second portion to the second distance.

9. The magnetic braking system of claim 8 further comprising:
   a rotatable drum biased by the biasing element;
   a linkage connecting the rotatable drum to the first portion, wherein the linkage includes a pivot point, and wherein the weight is applied at the rotatable drum such that the linkage pivots about the pivot point and moves the first portion from the first distance to the second distance; and
   a transmission rotatably connecting the rotatable drum to the first portion, wherein a rotation of the rotatable drum causes a corresponding rotation of the first portion via the transmission.

10. The magnetic braking system of claim 9 further comprising a length of material wound about the drum, wherein the weight is applied to the length of material.

11. The magnetic braking system of claim 5, wherein the biasing element is coupled to the second portion for biasing the second portion towards the first distance, wherein the applied weight generates the movement of the second portion relative to the first portion in the second distance.

12. The magnetic braking system of claim 11 further comprising:
a rotatable drum biased by the biasing element;
a linkage connecting the rotatable drum to the second portion, wherein the linkage includes a pivot point, and wherein the weight is applied at the rotatable drum such that the linkage pivots about the pivot point and moves the second portion from the first distance to the second distance; and
a transmission rotatably connecting the rotatable drum to the first portion, wherein a rotation of the rotatable drum causes a corresponding rotation of the first portion via the transmission.

13. The magnetic braking system of claim 12 further comprising a length of material wound about the drum, wherein the weight is applied to the length of material.

14. The magnetic braking system of claim 5, wherein the second portion is rotatable.

15. The magnetic braking system of claim 5, wherein the magnet element comprises a plurality of magnets.

16. The magnetic braking system of claim 15, wherein the plurality of magnets are arranged in an array, and wherein the array defines:
a first subset of the plurality of magnets disposed a first subset distance from a first datum; and
a second subset of the plurality of magnets disposed a second subset distance from the first datum.

17. The magnetic braking system of claim 16, wherein the first subset comprises a first number of magnets and the second subset comprises a second number of magnets, and wherein the second subset is different than the first subset.

18. The magnetic braking system of claim 16, wherein the first subset comprises a first density per a fixed unit area of magnets and the second subset comprises a second density per the fixed unit area of magnets, and wherein the second subset is different than the first subset.

19. The magnetic braking system of claim 16, wherein the first subset comprises a first area of magnets and the second subset comprises a second area of magnets, and wherein the second subset is different than the first subset.

20. The magnetic braking system of claim 5, wherein the second portion is spaced apart on a different approximately parallel plane from the first portion.

21. The magnetic braking system of claim 20, wherein the first portion has a plurality of either the magnetic element or the conductive element and the second portion has a plurality of the other one of the magnetic element or the conductive element.

* * * * *